United States Patent
Iwamitsu

(10) Patent No.: US 8,650,358 B2
(45) Date of Patent: Feb. 11, 2014

(54) STORAGE SYSTEM PROVIDING VIRTUAL VOLUME AND ELECTRICAL POWER SAVING CONTROL METHOD INCLUDING MOVING DATA AND CHANGING ALLOCATIONS BETWEEN REAL AND VIRTUAL STORAGE AREAS

(75) Inventor: Koji Iwamitsu, Odawara (JP)

(73) Assignee: Hitachi, Ltd., Tokyo (JP)

( * ) Notice: Subject to any disclaimer, the term of this patent is extended or adjusted under 35 U.S.C. 154(b) by 734 days.

(21) Appl. No.: 12/922,258

(22) PCT Filed: Aug. 26, 2010

(86) PCT No.: PCT/JP2010/005260
§ 371 (c)(1),
(2), (4) Date: Sep. 13, 2010

(87) PCT Pub. No.: WO2012/025964
PCT Pub. Date: Mar. 1, 2012

(65) Prior Publication Data
US 2012/0054430 A1 Mar. 1, 2012

(51) Int. Cl.
*G06F 12/00* (2006.01)
*G06F 1/00* (2006.01)

(52) U.S. Cl.
USPC .......................................................... 711/114

(58) Field of Classification Search
USPC .......................................................... 711/114
See application file for complete search history.

(56) References Cited

U.S. PATENT DOCUMENTS

| | | | |
|---|---|---|---|
| 6,583,947 B1 | 6/2003 | Hakamata et al. | |
| 2008/0126702 A1* | 5/2008 | Zimoto et al. | 711/114 |
| 2009/0125675 A1* | 5/2009 | Tsuboki et al. | 711/112 |
| 2009/0231750 A1 | 9/2009 | Hakamata et al. | |
| 2009/0292871 A1* | 11/2009 | Watanabe et al. | 711/114 |
| 2010/0005261 A1 | 1/2010 | Shiga et al. | |
| 2010/0023685 A1 | 1/2010 | Ikejiri et al. | |
| 2010/0070706 A1 | 3/2010 | Inomata | |
| 2010/0070731 A1* | 3/2010 | Mizuno et al. | 711/170 |
| 2012/0023292 A1* | 1/2012 | Saito et al. | 711/114 |

FOREIGN PATENT DOCUMENTS

JP 2000-293314 A1 10/2000

* cited by examiner

*Primary Examiner* — Sanjiv Shah
*Assistant Examiner* — Glenn Gossage
(74) *Attorney, Agent, or Firm* — Volpe and Koenig, P.C.

(57) ABSTRACT

A storage system includes a controller that specifies a first virtual volume (VVOL) and a first RAID group (RG) of an electrical power saving target. The controller judges whether there is a first real area based on the first RG that is allocated to a second VVOL. If there is, the controller moves data in the first real area to a free real area based on a second RG other than the first RG, and executes a moving processing in which a real area based on the second RG is allocated, as a substitute for the first real area, to a virtual area to which the first real area is allocated. The controller sets all of physical storage devices (PDEVs) that configure the first RG to be in an electrical power saving state if there is no real area based on the first RG that is allocated to the second VVOL.

14 Claims, 19 Drawing Sheets

| Type | Tier ID | Pool ID | RG ID |
|---|---|---|---|
| SSD | 00 | 0 | 00.01.··· |
| SAS | 01 | 0 | ··· |
| SATA | 02 | ··· | ··· |
| ··· | ··· | ··· | ··· |
| ··· | ··· | ··· | ··· |

| Pool ID | Belonging RG ID | Belonging VVOL ID |
|---|---|---|
| 0 | 00, 01 | 00, 01, 02, 03 |
| 1 | 02, 03 | 04, 05 |
| 2 | 04 | 06 |

| VVOL ID | Total number of pages | Number of allocated pages | Number of allocated chunks | Belonging pool | Tier priority | Last allocated RG ID | VVOL electrical power saving attribute |
|---|---|---|---|---|---|---|---|
| 00 | 500 | 500 | 100 (01) | 0 | ON | 00 | With |
| 01 | 1000 | 100 | 20 (02) | 0 | OFF | 01 | Without |
| 02 | 500 | 50 | 10 (03) | 0 | OFF | 01 | Without |
| 03 | 200 | 100 | 20 (04) | 0 | OFF | 00 | With |
| 04 | 2000 | 2000 | 400 (05) | 1 | ON | 02 | With |
| 05 | 1500 | 100 | 20 (06) | 1 | ON | 03 | With |
| 06 | 500 | 5 | 1 (07) | 2 | OFF | 04 | Without |

Fig. 8

| RG ID | Pool ID | Total number of chunks | Number of used chunks | Tier type | Belonging VVOL | RG electrical power saving attribute | Status | Flag |
|---|---|---|---|---|---|---|---|---|
| 00 | 0 | 1000 | 120 | SATA | 00, 03 | With | Spin down | ON |
| 01 | 0 | 3000 | 30 | SAS | 01, 02 | Without | N/A | OFF |
| 02 | 1 | 4000 | 400 | SAS | 04 | With | Spin up | OFF |
| 03 | 1 | 2000 | 20 | SSD | 05 | With | Spin Down (Sleep) | OFF |
| 04 | 2 | 1500 | 1 | SAS | 06 | Without | N/A | OFF |

| Pool ID | Chunk ID | Chunk status | RG ID | Real page ID | Page status |
|---|---|---|---|---|---|
| 00 | 00 | On use | ... | 00000 | On use |
| | | | | 00001 | Free |
| | | | | ... | ... |
| | 01 | Free | | 00005 | Free |
| | ... | ... | ... | ... | ... |
| 01 | ... | ... | | ... | ... |

| VVOL ID | Capacity | Usage rate | RG ID | Pool ID | VVOL electrical power saving attribute |
|---|---|---|---|---|---|
| 0 | 100G | 90% | 0 | N/A | N/A |
| 1024 | 1T | 10% | N/A | 0 | Without |
| 3048 | 5T | 50% | 99 | 1 | With |
| 4010 | 200T | 60% | N/A | 2 | Without |
| ... | ... | ... | ... | ... | ... |

2000

STORAGE SYSTEM PROVIDING VIRTUAL VOLUME AND ELECTRICAL POWER SAVING CONTROL METHOD INCLUDING MOVING DATA AND CHANGING ALLOCATIONS BETWEEN REAL AND VIRTUAL STORAGE AREAS

FIELD OF INVENTION

The present invention relates to a storage control to which thin provisioning, which may be referred to as dynamic provisioning is applied.

BACKGROUND

A technique that is disclosed in Patent Literature 1 [PTL1], cited below, is known as a technique that is related to an electrical power saving for a storage system for instance.

Patent Literature 1 discloses a storage system that is provided with a plurality of magnetic disk apparatuses. For the storage system, a magnetic disk in a magnetic disk apparatus to which an access is not executed for a certain period of time is made to be in a spin down state. By this configuration, an electrical power saving for a storage system can be carried out.

[PTL 1] Japanese Patent Application Laid-Open Publication No. 2000-293314.

A technique that is called Thin Provisioning (also referred to as Dynamic Provisioning) is known. In Thin Provisioning, one or a plurality of virtual logical volumes (virtual volumes) correspond to one or a plurality of substantive storage areas (hereafter referred to as pools) based on a physical storage device group, respectively. The virtual volume is configured by a plurality of virtual storage areas (virtual pages), and the pool is configured by a plurality of substantive storage areas (real pages). For instance, in the case in which a storage system receives a write request that specifies a virtual volume from a host, the storage system allocates a real page in a pool that corresponds to the virtual volume that is specified by the write request to a virtual page that is specified by the write request. The write target data that complies with the received write request is then written to the allocated real page.

An electrical power saving technique that is disclosed in PTL 1 is applied to a storage system to which Thin Provisioning is applied. In the case in which a physical storage device that is in an electrical power saving state is a physical storage device that is a basis of a pool (hereafter referred to as a pool storage device), it is thought that an effect of an electrical power saving is low. More specifically, one of the following (1) and (2) is considered: (1) a pool storage device is not likely to be accessed for a certain period of time; and (2) even in the case in which the pool storage device is made to be in an electrical power saving state since the pool storage device is not accessed for a certain period of time, the electrical power saving state is canceled immediately due to an access. This is because even in the case in which any one of virtual volumes that are associated with a pool is accessed, any one of pool storage devices that are a basis of the pool is possible to be accessed.

An object of the present invention is to improve an effect of an electrical power saving for a storage system to which Thin Provisioning is applied.

SOLUTION TO PROBLEM

A storage system is provided with a plurality of RAID (Redundant Array of Independent (or Inexpensive) Disks) groups and a controller that is coupled to the plurality of RAID groups and at least one host. The controller can be provided with a storage resource. The storage resource can store prescribed information.

Each of the RAID groups is configured by at least two physical storage devices. The plurality of RAID groups is a basis of a pool that is a storage area that is configured by a plurality of real areas. The controller provides a plurality of virtual volumes that are associated with the pool to at least one host. Each of the virtual volumes is a virtual logical volume that is configured by a plurality of virtual areas. In the case in which the controller receives a write command from the host, the controller specifies a virtual area of a write destination from the write command, allocates a free real area of the pools to the specified virtual area of a write destination, and writes the write target data accompanying with the write command to the allocated real area.

The controller specifies a first virtual volume (VVOL) that is a virtual volume of an electrical power saving target and a first RAID group (RG) that is a RAID group of an electrical power saving target. The controller judges whether or not there is a first real area that is allocated to a second VVOL that is a virtual volume other than the first VVOL and that is a real area based on the first RG. In the case in which the result of the judgment is positive, the controller moves data in the first real area to a free real area based on a second RG that is a RAID group other than the first RG, and executes a first moving processing in which a real area of a moving destination as substitute for a first real area to a virtual area to which the first real area is allocated. The controller sets all of physical storage devices that configure the first RG to be in an electrical power saving state in the case in which there is not real area that is allocated to a second VVOL as a real area based on the first RG.

BRIEF DESCRIPTION OF THE DRAWINGS

FIG. 5 shows a configuration of a tier definition table 401.

FIG. 6 shows a configuration of a pool management table 402.

FIG. 7 shows a configuration of a VVOL management table 403.

FIG. 8 shows a configuration of an RG management table 404.

FIG. 10 shows a configuration of a real page management table 406.

DETAILED DESCRIPTION

The storage systems in accordance with an embodiment of the present invention will be described below in detail with reference to the drawings. In the following descriptions, targets of a variety of kinds are represented by a combination of a name and an ID as substitute for reference symbols in some cases. For instance, in the case in which a logical volume is represented by a reference symbol 500, "a logical volume 500" is noted. Moreover, in the case in which a logical volume having an ID of 00 is represented by a reference symbol 500, "a logical volume #00" is noted.

Figure 1:
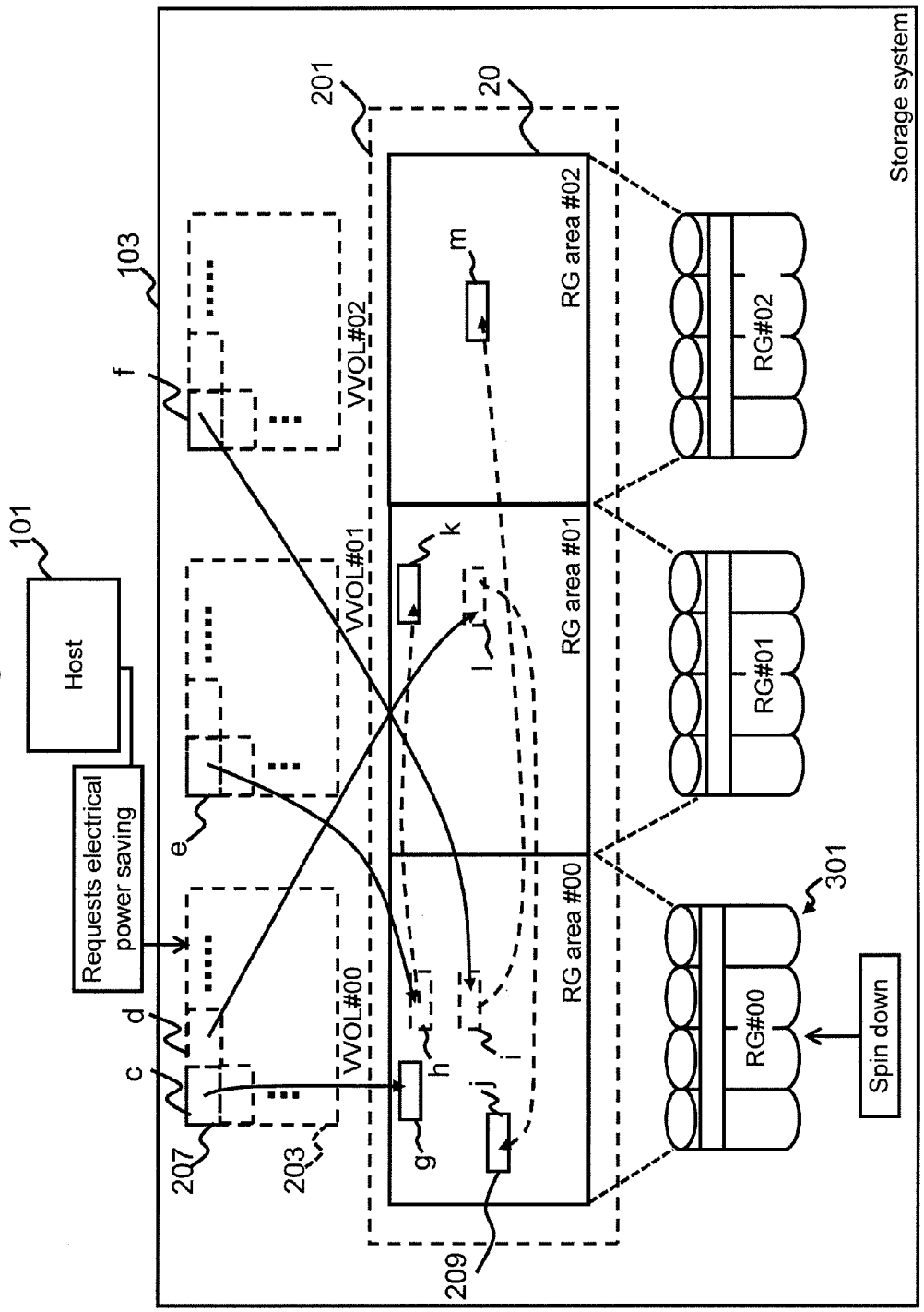
FIG. 1 shows a host coupled to a storage system in accordance with the present invention.

FIG. 1 shows a host coupled to a storage system in accordance with the present invention.

A host apparatus (hereafter referred to as a host) 101 is coupled to a storage system 103. One host 101 or a plurality of hosts 101 can be coupled to a storage system 103. The storage system 103 provides one or a plurality of virtual volumes (hereafter referred to as a VVOL (Virtual VOLume)) 203 to the host 101. The storage system 103 is provided with a pool 201 based on a plurality of RAID (Redundant Array of Independent (or Inexpensive) Disks) groups (hereafter referred to as an RG) 301. The pool 201 is provided with a plurality of RG areas 20.

The VVOL 203 is a virtual logical volume that complies with Thin Provisioning, that is, a logical volume that is not based on an RG 301. The VVOL 203 is configured by a plurality of virtual pages 207. The virtual page 207 a virtual storage area. As the VVOL 203, there are three VVOLs #00, #01, and #02. The VVOL 203 is a storage area that can be recognized by the host 101. In the case in which the storage system 103 receives a write request that specifies the VVOL 203 from the host 101, the storage system 103 allocates a real page 209 to a virtual page 207 to which an address that is included in the write request (for instance, an LBA (Logical Block Address)) belongs.

The RG area 20 is configured by a plurality of real pages 209. The real page 209 is a substantive storage area. As the RG area 20, there are three RG areas #00, #01, and #02. One RG area is one storage area based on one RG 301. For instance, the RG area #00 is based on RG #00. The RG 301 is configured by a plurality of physical storage devices (hereafter referred to as a PDEV). One RG area 20 is configured by one or a plurality of logical volumes based on one RG 301 (real volume (hereafter referred to as an RVOL (Real VOLume)).

One or a plurality of VVOL 203 is associated with the pool 201. In an example shown in FIG. 1, VVOLs #00, #01, and #02 are associated with the pool 201. As a result, each of the RG areas #00, #01, and #02 is corresponded to VVOLs #00, #01, and #02.

The host 101 is a computer in general. However, the host 101 can also be another storage system as substitute for a computer. The host 101 transmits an I/O (Input/Output) command to the storage system 103 for instance. The I/O command is a write command or a read command for instance, and is provided with the I/O destination information. The I/O destination information is information that indicates an I/O destination, and includes an ID of the VVOL 203 (for instance, a LUN (Logical Unit Number)) and an address of the I/O destination (for instance, an LBA (Logical Block Address)). The VVOL 203 and the virtual page 207 of the I/O destination can be specified by the I/O destination information.

The storage system 103 receives a write command from the host 101, and specifies the virtual page 207 of a write destination based on the I/O information that is included in the write command. The storage system 103 allocates any one of the free real pages 209 (in an unallocated state) to the specified virtual page 207 of a write destination, and writes the write target data that complies with the write command to the real page 209. At this time, the real page 209 that is allocated to the virtual page 207 of a write destination is selected from the pools 201 that are associated with the VVOL 203 that is provided with the virtual page 207. For an explanation in the following, a virtual page #b in a VVOL #a is represented as a virtual page # (a-b), and a real page #b in an RG area #a is represented as a real page # (a-b). An explanation is carried out with reference to FIG. 1. In the case in which a virtual page (#00-c) of a write destination is specified from the I/O information for instance, the storage system 103 allocates a free real page (#00-g) to a virtual page (#00-c) of a write destination. In the example shown in the figure, a real page (#01-l) is allocated to a virtual page (#00-d), a real page (#01-h) is allocated to a virtual page (#01-e), and a real page (#00-i) is allocated to a virtual page (#02-f).

The host 101 can transmit an electrical power saving request to the storage system 103. The electrical power saving request includes an ID of the VVOL 203 that is to be in an electrical power saving state.

The storage system 103 receives an electrical power saving request from the host 101, and specifies the VVOL 203 that is an electrical power saving target by the electrical power saving request. Hereafter, a VVOL that is specified as an electrical power saving target is referred to as a target VVOL in the descriptions of FIG. 1. The target VVOL is a VVOL #00.

The storage system 103 selects one RG #00 from a plurality of RGs #00, #01, and #02 that are the basis of the pool 201 that is corresponded to the target VVOL #00 based on the prescribed conditions (in other words, the storage system 103 selects one RG area from the pools 201 with which the target VVOL is associated based on the prescribed conditions). The storage system 103 moves data in a real page that satisfies the following conditions (x1) and (x2) to a free real page in the selected RG area #00: (x1) a real page that is allocated to a virtual page in the target VVOL #00; and (x2) a real page in the RG area #01 or #02 other than the RG area #00 that is corresponded to the selected RG #00 (hereafter referred to as a selected RG area).

[002ˆ] In the example shown in FIG. 1, a real page that satisfies the above conditions (x1) and (x2) is a real page (#01-l) that is allocated to a virtual page (#00-d) in the target VVOL #00. Consequently, the storage system 103 moves data in a real page (#01-l) to a free real page (#00-j) in the selected RG area #00. The storage system 103 then changes a real page that is allocated to a virtual page (#00-d) from a real page of a moving source (a real page (#01-l)) to a real page of a move destination (a real page (#00-j)).

The storage system 103 moves data in a real page that satisfies the following conditions (y1) and (y2) to a free real page in an RG area other than the selected RG area #00 (an RG area in the pool 201 with which the target VVOL #00 is associated): (y1) a real page in the selected RG area #00; and (y2) a real page that is allocated to a virtual page in the VVOL

01 or #02 other than the target VVOL #00 (a VVOL that is associated with a pool with which the target VVOL #00 is associated).

In the example shown in FIG. 1, a real page that satisfies the above conditions (y1) and (y2) is the real pages (#00-*h*) and (#00-*i*). The storage system 103 moves data in a real page (#00-*h*) to a free real page (for instance, a real page (#01-*k*) in an RG area other than the selected RG area #00. The storage system 103 then changes a real page that is allocated to a virtual page (#01-*e*) from a real page (#00-*h*) to a real page (#01-*k*). Moreover, the storage system 103 moves data in a real page (#00-*i*) to a free real page (for instance, a real page (#02-*m*) in an RG area other than the selected RG area #00. The storage system 103 then changes a real page that is allocated to a virtual page (#02-*f*) from a real page (#00-*i*) to a real page (#02-*m*).

In the case in which the following states (z1) and (z2) are set by the above processing, the storage system 103 sets all of PDEVs that configure the RG #00 that is corresponded to the selected RG area #00 to be in an electrical power saving state: (z1) all data in the target VVOL #00 is stored in the selected RG area #00; and (z2) all data in the VVOLs #01 and #02 other than the target VVOL #00 is stored in at least one RG area #01 and/or #02 other than the selected RG area #00.

In the case in which the PDEV is a storage device that is provided with a storage medium of a disk type (for instance, an HDD (Hard Disk Drive) or a DVD (Digital Versatile Disk) drive), an electrical power saving state can be a spin down state. A rotation speed of a disk of a storage device in a spin down state is lower than a rotation speed in an I/O (Input/Output) to the disk (for instance, equal to or larger than 0). Moreover, in the case in which the PDEV is a storage device that is provided with a memory (for instance, an SSD (Solid State Drive)), an electrical power saving state can be a sleep state. For a storage device in a sleep state, a power feeding to a prescribed circuit is blocked off.

The present embodiment will be described below in detail with reference to the drawings.

Figure 2:
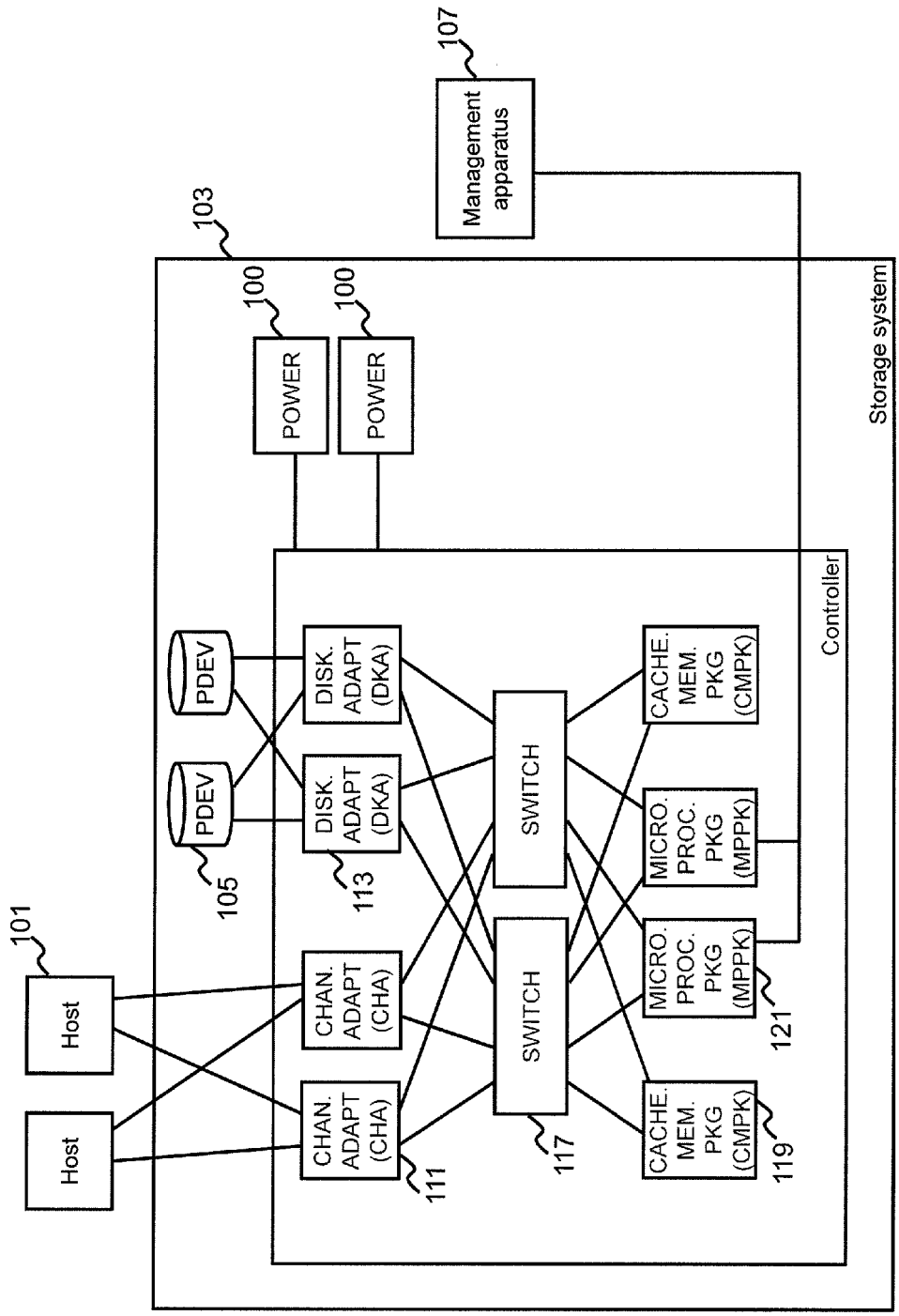
FIG. 2 shows a configuration of a storage system 103 in accordance with an embodiment of the present invention.

FIG. 2 shows a configuration of a storage system 103 in accordance with an embodiment of the present invention.

The storage system 103 is provided with a plurality of PDEVs 105, a controller that is coupled to the plurality of PDEVs 105, and a power supply unit 100.

The plurality of PDEVs 105 includes PDEVs of a plurality of types, such as an SSD (Solid State Drive) and an HDD (Hard Disk Drive). As the HDD, a SATA (Serial Advanced Technology Attachment or Serial ATA)-HDD and a SAS (Serial Attached SCSI)-HDD are mentioned for instance.

The controller is provided with a memory, an interface that is coupled to the host 101, an interface that is coupled to the PDEVs 105, and a processor that is coupled to those. More specifically, the controller is provided with a plurality of CHA (channel adapters) 111, a plurality of DKA (disk adapters) 113, a plurality of MPPK (microprocessor packages) 121, a plurality of CMPK (cache memory packages) 119, and SW (switches) 117 that are coupled to those. There are a plurality of CHAs 111, a plurality of DKAs 113, a plurality of MPPKs 121, a plurality of SWs 117, and a plurality of power supply units 100 based on the point of view of redundancy. Regardless of the figure, the number of at least one of the CHAs 111, the DKAs 113, the MPPKs 121, the SWs 117, and the power supply units 100 can be more than or less than two. The number of the CMPKs 119 can be more than two.

A plurality of packages of CHA 111, DKA 113, CMPK 119, and MPPK 121 are coupled to the SWs 117. The SW 117 controls a connection between PKs (packages). The power supply unit 100 supplies an electrical power based on an electrical power from a commercial power supply to each of packages 111, 113, 119, 121, and switches 117.

The CHA 111 is an interface apparatus that is coupled to the host 101. The CHA 111 receives an I/O command (a write command or a read command) from the host 101, and transmits the received I/O command to any one of the plurality of the MPPKs 121. The CHA 111 also receives an electrical power saving request that specifies the virtual volume 203 from the host 101, and transmits the received electrical power saving request to any one of the plurality of the MPPKs 121.

The DKA 113 is an interface apparatus that is coupled to the PDEV 105. The DKA 113 reads data from the PDEV 105, and transmits the data to the CMPK 119. The DKA 113 also writes data from the CMPK 119 to the PDEV 105.

The MPPK 121 is an apparatus that is provided with one or a plurality of MP (microprocessor). The MP processes an I/O command and an electrical power saving request from the CHA 111.

A plurality of packages of CHA 111, DKA 113, CMPK 119, and MPPK 121 are coupled to the SWs 117. The SW 117 controls a connection between PKs (packages).

The CMPK 119 is provided with a volatile memory and/or a nonvolatile memory. The CMPK 119 is provided with a storage area (a real page 209) in which the target data of an I/O to a virtual page 207 is stored on a temporary basis for instance (hereafter referred to as a cache memory or a CM as an abbreviation thereof). Moreover, the CMPK 119 is provided with a storage area in which information and computer programs of a variety of types are stored. The information and computer programs will be described later.

A management apparatus 107 is coupled to the storage system 103. The management apparatus 107 is a computer that is provided with a display apparatus and input apparatus for instance. A manager can carry out configurations of a variety of kinds from the management apparatus 107 to the storage system 103.

Figure 3:
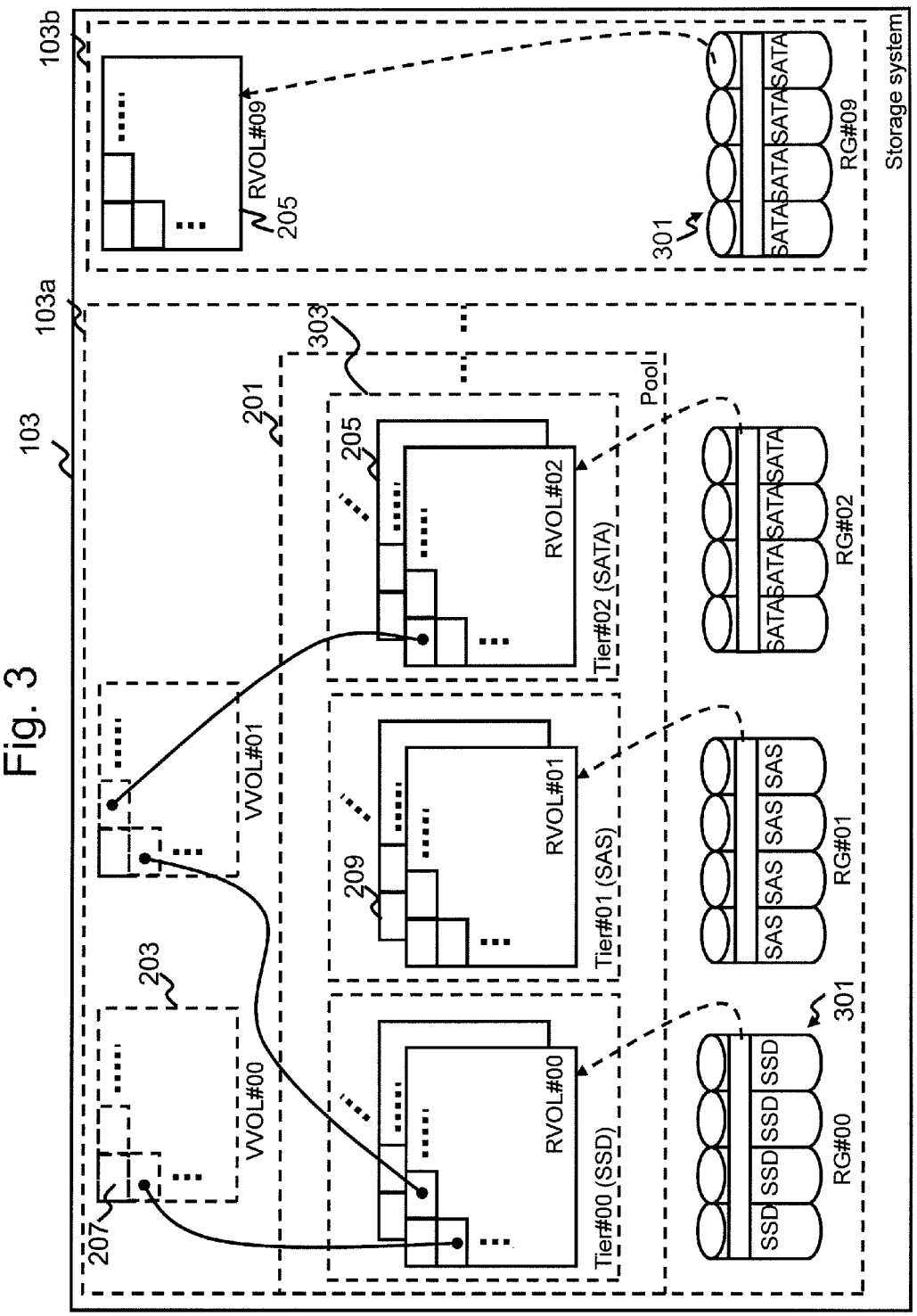
FIG. 3 shows a relationship of storage areas of a variety of kinds for the storage system 103.

FIG. 3 shows a relationship of storage areas of a variety of types for the storage system 103.

As shown in FIG. 3, the storage system 103 is provided with systems of two types composed of a normal system 103*b* and a system that complies with Thin Provisioning (hereafter referred to as a TP system) 103*a*. The normal system 103*b* is provided with at least one RG 301 and at least one RVOL (real volume) in the range from a lower level to an upper level. On the other hand, the TP system 103*a* is provided with at least one RG 301, at least one pool 201, and at least one VVOL 203 in the range from a lower level to an upper level.

The normal system 103*b* will be described at first.

For the normal system 103*b*, an RVOL 205, for instance RVOL#09, based on the RG 301, for instance RG#09 is directly coupled to the host 101. Consequently, the host 101 recognizes the RVOL 205. The host 101 transmits an I/O command that specifies the RVOL 205, and the storage system 103 executes an I/O of data to the RVOL 205 that is specified by the I/O command.

The TP system 103*a* will be described in the next place.

One RG 301 is configured by the PDEV 105 that belongs to the same tier. The tier to which the PDEV 105 belongs is defined by at least one of a type, a performance, the power consumption, and a storage capacity of the PDEV for instance. The performance is a speed of an I/O of data or a response time (a time length from when the PDEV receives an I/O request from a controller to when the PDEV returns a response) for instance. The power consumption is rated power consumption or power consumption in the case in which a prescribed processing is executed for a prescribed period of time for instance.

In the example shown in FIG. 3, an RG #00 is composed of a plurality of SSDs, an RG #01 is composed of a plurality of SAS-HDDs, and an RG #02 is composed of a plurality of SATA-HDDs. An order of the types of the PDEV 105 is SATA>SAS>SSD from an order of a lower performance. An order of the types of the PDEV 105 is SAS>SATA>SSD from an order of a higher power consumption.

The pool 201 is an aggregation of real pages 209. More specifically, the pool 201 is composed of at least one RVOL 205, and each RVOL 205 is composed of at least one real page 209. The pool 201 is provided with at least two chunks (not shown), and each chunk is composed of at least two real pages 209.

The real page 209 that configures one pool 201 is hierarchized. In other words, a plurality of tiers 303 exists in one pool 201. The tier 303 exists for every type of the RVOL 205 for instance. The type of the RVOL 205 depends on the type of the RG 301 that is a basis of the RVOL 205. In the example shown in FIG. 3 for instance, since there are three types of RVOLs 205, the number of tiers 303 is three. Consequently, the RVOL 205 of a type that corresponds to one tier 303 belongs to the tier 303. More specifically, a tier #00 is a type of SSD, and at least one RVOL (for instance, RVOL #00) based on at least one RG (for instance, RG #00) that is composed of SSD belongs to the tier #00. A tier #01 is a type of SAS, and at least one RVOL (for instance, RVOL #01) based on at least one RG (for instance, RG #01) that is composed of SAS belongs to the tier #01. A tier #02 is a type of SATA, and at least one RVOL (for instance, RVOL #02) based on at least one RG (for instance, RG #02) that is composed of SATA belongs to the tier #02. It is not necessary that only an RVOL of the same type belongs to the same tier 303 in a precise sense. A plurality of RVOLs 205 of the similar types can belong to the same tier 303.

The pool 201 that is an allocation source is associated with the VVOL 203. At least one VVOL 203 is associated with one pool 201.

Figure 4:
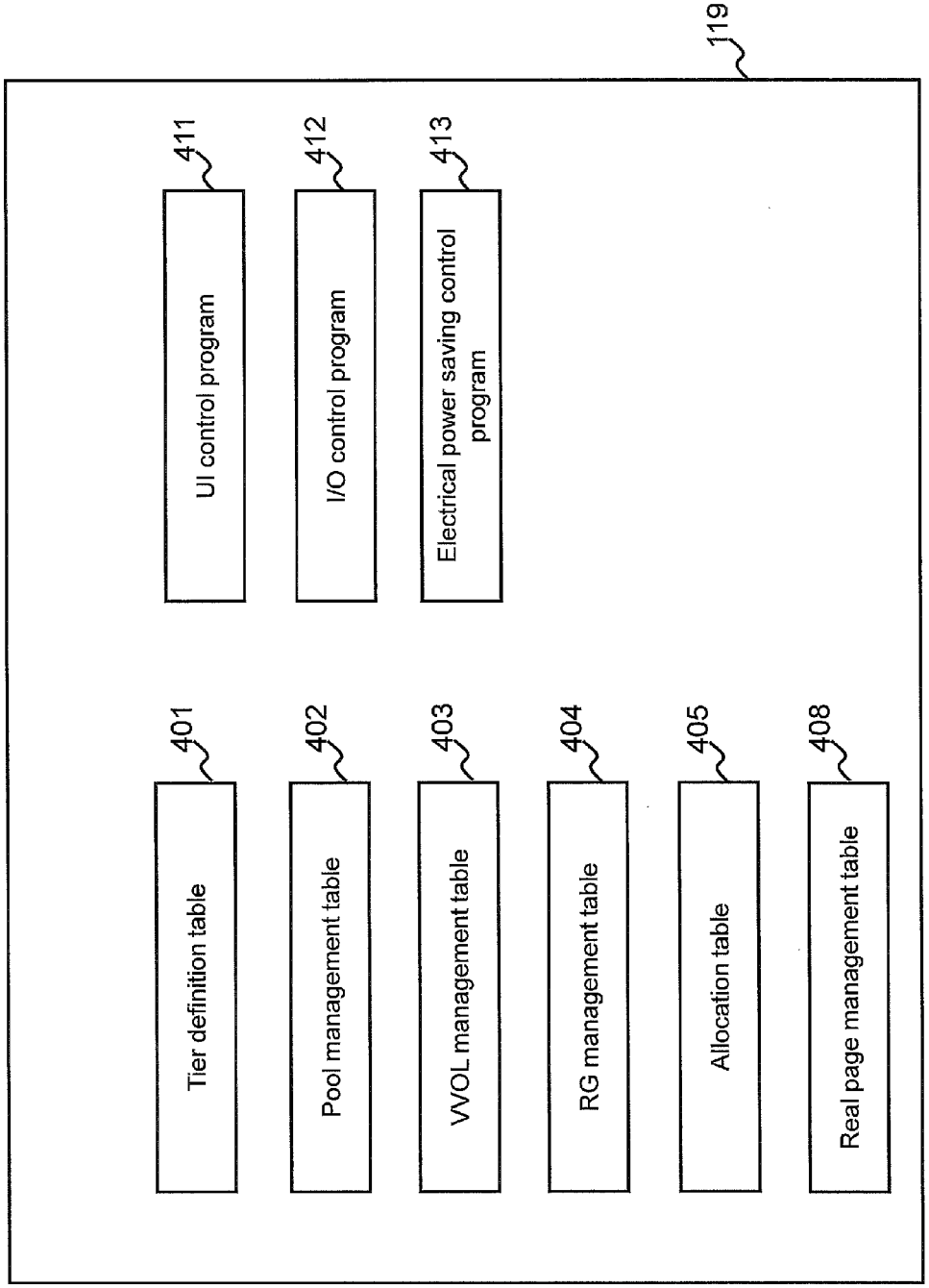
FIG. 4 shows information and a computer program that are stored in a cache memory package (CMPK) 119.

FIG. 4 shows information and a computer program that are stored in the CMPK 119. In the present embodiment, although a table is adopted as an example of information, a form other than a table (for instance, a queue form) can also be adopted as information.

The CMPK 119 stores a tier definition table 401, a pool management table 402, a VVOL management table 403, an RG management table 404, an allocation table 405, and a real page management table 406 as information. Moreover, the CMPK 119 stores a UI control program 411 that is a program that controls a UI (User Interface), an I/O control program 412 that is a program that controls an I/O, and an electrical power saving control program 413 that is a program that executes an electrical power saving control as a computer program. At least one of the tables and the computer programs can also be stored in a storage resource other than the CMPK 119. For instance, at least one computer program can be stored in a memory in an MPPK 121.

Each of the tables will be described in the following. Although a target is specified by using an ID in the following descriptions, a target can also be specified by using at least one of names and numbers as substitute for or in addition to an ID.

FIG. 5 shows a configuration of a tier definition table 401.

The tier definition table 401 is a table that indicates a definition of a tier. More specifically, the table 401 indicates for every tier a relationship among a type of a tier, a tier ID, a pool ID of a pool to which a tier belongs, and an RG ID of an RG that belongs to a tier for instance. By the table 401, a tier to which an ID of "00" is imparted as a tier that is corresponded to an RVOL of a type SSD is prepared in a pool of an ID of "0". An RG to which an ID such as "00" and "01" is imparted belongs to the tier "00".

FIG. 6 shows a configuration of a pool management table 402.

The pool management table 402 is a table that manages the information related to a pool. More specifically, the table 402 indicates for every pool a relationship among a pool ID, a belonging RG ID that indicates an RVOL that belongs to a pool, and a belonging VVOL ID that indicates a VVOL that is corresponded to a pool for instance. By the table 402, an RG ID or RVOL to which an ID such as "00" and "01" is imparted belongs to a pool to which an ID of "00" is imparted, and a VVOL to which an ID such as "00", "01", "02", and "03" is imparted belongs to the pool to which an ID of "00" is imparted.

FIG. 7 shows a configuration of a VVOL management table 403.

The VVOL management table 403 is a table for managing the information related to a VVOL. More specifically, the table 403 is provided with a VVOL ID, the total number of pages, the number of allocated pages, the number of allocated chunks, a belonging pool, a tier priority, a last allocated RG ID, and a VVOL electrical power saving attribute, for instance. As an example of one VVOL (hereafter referred to as a target VVOL in the descriptions of FIG. 7), the above information elements for the table 403 are as follows:

(*) The VVOL ID is an ID of a target VVOL. (*) The total number of pages is the total number of virtual pages in a target VVOL. (*) The number of allocated pages is the number of virtual pages to which a real page has been allocated for virtual pages in a target VVOL. (*) The number of allocated chunks is the number of chunks that have been allocated to a target VVOL. A free real page is allocated from the latest allocated chunk to a virtual page in a target VVOL (a number in parentheses in the figure is an ID of the latest allocated chunk). In the case in which there is no free real page for the latest allocated chunk, a free chunk is allocated newly, and a free real page is allocated from the newly allocated free chunk to a virtual page of a target VVOL.

(*) The belonging pool is an ID of a pool that is associated with a target VVOL. The ID is equal to a pool ID corresponding to the VVOL ID in the pool management table 402 of FIG. 6.

(*) The tier priority is whether or not a priority is given to a tier type in the case in which a real page that is allocated to a virtual page of a target VVOL is determined. "ON" represents that a priority is given to a tier type, and "OFF" represents that a priority is not given to a tier type.

(*) The last allocated RG ID is an ID of an RG that is provided with a real page that has been last allocated to a virtual page in a target VVOL (a last allocated RG). The RG that is an allocation source of a real page is changed by an RG electrical power saving attribute that will be described later. In the case in which a VVOL electrical power saving attribute is "without", a real page based on an RG provided with an RG electrical power saving attribute of "without" is allocated to a virtual page in a target VVOL. In the case in which there is a plurality of RGs provided with an RG electrical power saving attribute of "without", an RG of an allocation source is changed in a round robin fashion every time one real page is allocated. In the case in which a VVOL electrical power saving attribute is "with", a real page based on an RG provided with an RG electrical power saving attribute of "with" is allocated to a virtual page in a target VVOL. In this case, an RG that is specified by the last allocated RG ID has a free space, a real page in the RG is allocated to a virtual page in a target VVOL. In other words, the last allocated RG ID is fixed for a VVOL provided with a VVOL electrical power saving attribute of "with", and therefore a real page based on the same RG is allocated to a virtual page in a target VVOL on a constant basis. The description will be carried out with reference to FIGS. 6, 7, and 8. In the case in which a target VVOL is a VVOL #00 for instance, a VVOL electrical power saving attribute is "with" and the last allocated RG is an RG #00. In FIG. 8, the number of used chunks of an RG #00 does not reach the total number of chunks. In this case, a real page based on the RG #00 is allocated to a virtual page in the VVOL #00 on a constant basis. Moreover, in the case in which a target VVOL is a VVOL #1 for instance, a VVOL electrical power saving attribute is "without". In FIG. 6, an RG that is corresponded to the VVOL #1 is the RG #00 and the RG #01. Among them, an RG provided with an RG electrical power saving attribute of "without" is only the RG #01 (see FIG. 8). In this case, a real page based on the RG #01 is allocated to a virtual page in the VVOL #1. In the case in which there is a plurality of RGs that is corresponded to the VVOL #1, an RG of an allocation source of a real page is changed in a round robin fashion.

(*) The VVOL electrical power saving attribute is whether or not a target VVOL is provided with an electrical power saving attribute. In the case in which a VVOL electrical power saving attribute is "with", a target VVOL is provided with an electrical power saving attribute. In the case in which a VVOL electrical power saving attribute is "without", a target VVOL is not provided with an electrical power saving attribute. In the case in which an electrical power saving request that specifies a target VVOL is received from the host, a VVOL electrical power saving attribute becomes "with". In the case in which an I/O request that specifies a target VVOL (or an electrical power saving release request) is received from the host during a period when a VVOL electrical power saving attribute is "with", a VVOL electrical power saving attribute becomes "without".

FIG. 8 shows a configuration of an RG management table 404.

The RG management table 404 is a table for managing the information related to an RG. More specifically, the table 404 is provided with an RG ID, a pool ID, the total number of chunks, the number of used chunks, a tier type, a belonging VVOL, an RG electrical power saving attribute, a status, and a flag for every RG for instance. As an example of one RG (hereafter referred to as a target RG in the descriptions of FIG. 8), the above information elements for the table 404 are as follows:

(*) The RG ID is an ID of a target RG.

(*) The pool ID is an ID of a pool to which a target RG belongs.

(*) The tier type is a type of a tier to which an RVOL based on a target RG belongs. The tier type is equal to a type of a target RG. In the case in which the RG type is SSD for instance, the tier type is also SSD.

(*) The belonging VVOL is an ID of a VVOL that is associated with a target RG. An ID that is registered as a belonging VVOL is dynamically increased. In the case in which a chunk based on the RG #00 that is a basis of the pool #0 is newly allocated to the VVOL #01 for instance, an ID "1" is added as a belonging VVOL of the RG #00 (not shown in FIG. 8).

(*) The RG electrical power saving attribute is whether or not a target RG is provided with an electrical power saving attribute. In the case in which an RG electrical power saving attribute is "with", a target RG is provided with an electrical power saving attribute. In the case in which an RG electrical power saving attribute is "without", a target RG is not provided with an electrical power saving attribute. The case in which a target RG is provided with an electrical power saving attribute means that the RG is a target of an electrical power saving.

(*) The status represents a status of a target RG. In the case in which an RG electrical power saving attribute is "without", a status of a target RG is "N/A" on a constant basis. "N/A" represents a non electrical power saving state (an operating state). In the case in which an RG electrical power saving attribute is "with", a target RG is in a spin down state ("spin down") or a spin up state ("spin up"). The spin down state is a kind of an electrical power saving state, and indicates that a disk is in a low-speed rotation state. In the case in which the PDEV is SSD, the spin down state can be a sleep state. The spin up state is a state in which a disk is rotated at a high speed in such a manner that an I/O can be executed. In the case in which an RG electrical power saving attribute is "with", a target RG is in a spin down state in principle, and a target RG can be in a spin up state on a temporary basis only in the prescribed case.

(*) The flag indicates whether or not a target RG can be in an electrical power saving state (that is, a spin down state). "ON" represents that a target RG can be in a spin down state at any time. "OFF" represents that a target RG cannot be in a spin down state. The state in which a target RG can be in an electrical power saving state (a spin down state) represents that a state in which any real page based on a target RG cannot be allocated to a VVOL other than a VVOL of an electrical power saving target.

Figure 9:
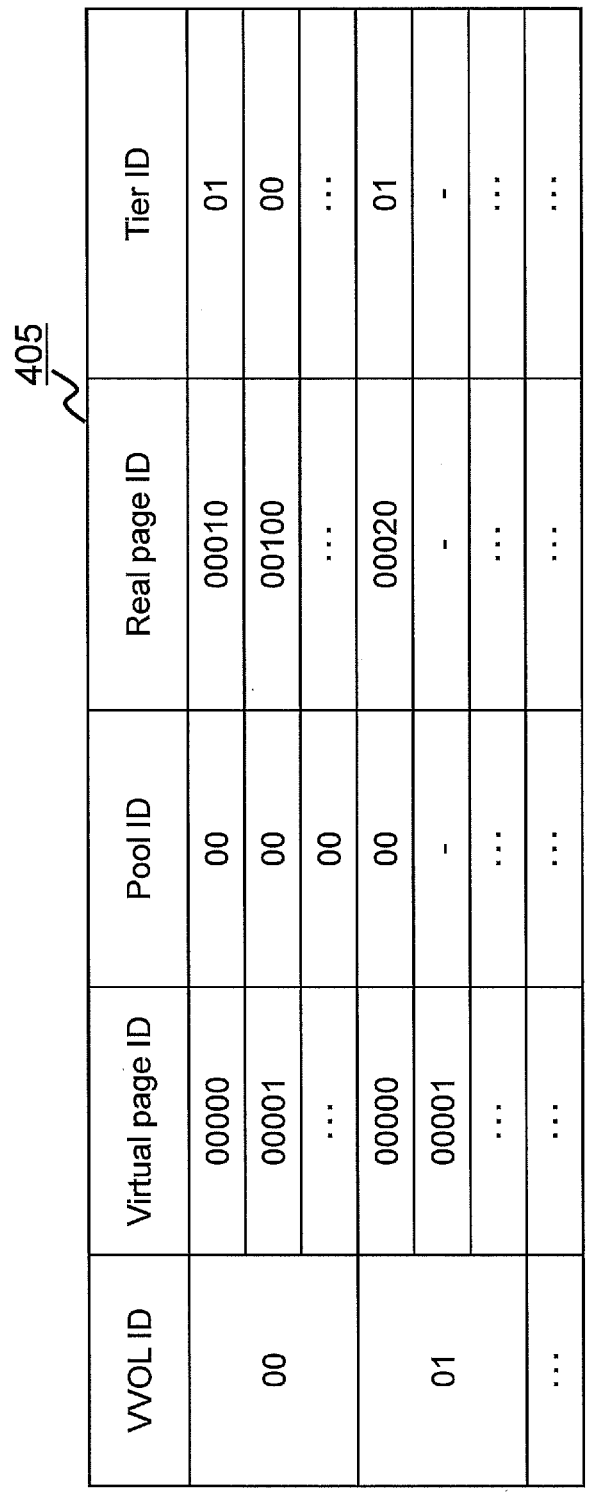
FIG. 9 shows a configuration of an allocation table 405.

FIG. 9 shows a configuration of an allocation table 405.

The allocation table 405 is a table that indicates a virtual page and a real page that is allocated to the virtual page. More specifically, the table 405 is provided with a VVOL ID, a virtual page ID, a pool ID, a real page ID, and a tier ID for every virtual page for instance. As an example of one virtual page (hereafter referred to as a target virtual page in the descriptions of FIG. 9), the above information elements for the table 405 are as follows.

(*) The VVOL ID is an ID of a VVOL that is provided with a target virtual page.

(*) The virtual page ID is an ID of a target virtual page.

(*) The pool ID is an ID of a pool that is allocated to a VVOL that provided with a target virtual page.

(*) The real page ID is an ID of a real page that is allocated to a target virtual page.

(*) The tier ID is an ID of a tier that is provided with a real page that is allocated to a target virtual page.

FIG. 10 shows a configuration of a real page management table 406.

The real page management table 406 is a table for managing a state of a real page. More specifically, the table 406 is provided with a pool ID, a chunk ID, a chunk status, an RVOL ID, a real page ID, and a page status for every real page for instance. As an example of one real page (hereafter referred to as a target real page in the descriptions of FIG. 10), the above information elements for the table 406 are as follows more specifically:

(*) The pool ID is an ID of a pool that is provided with a target real page.

(*) The chunk ID is an ID of a chunk to which a target real page belongs.

(*) The chunk status ID is a status of a chunk to which a target real page belongs (hereafter referred to as a corresponded chunk). As a value of a status of a corresponded chunk, "On use" and "Free" can be mentioned for instance. "On use" represents that any one of real pages that belong to a corresponded chunk has been allocated to a virtual page. "Free" represents that the real pages that belong to a corresponded chunk have not been allocated to a virtual page.

(*) The RG ID is an ID of an RG that is provided with a target real page.

(*) The real page ID is an ID of a target real page.

(*) The page status ID is a status of a target real page. As a value of a status, "On use" and "Free" can be mentioned for instance. "On use" represents that a target real page has been allocated to any one of virtual pages. "Free" represents that a target real page has not been allocated to any virtual page and therefore a target real page is in a state in which the target real page can be allocated to any virtual page.

The processing that is executed in the present embodiment will be described. In the following descriptions, the processing will be described while using a program as a subject in some cases. However, since a program is executed by a processor (for instance, a CPU (Central Processing Unit)) and a determined processing is executed while using a storage resource (such as a memory) and/or a communication interface (such as a communication port) as one sees fit, a subject of a processing can also be a processor. The processing that is described by using a program as a subject can also be a processing that is executed by an MPPK, a controller, or a storage system. Moreover, a processor can include a hardware circuit that executes a part or a whole of processing that is executed by the processor.

<Processing that is Executed in the Case in which an I/O Command is Received from a Host>

Figure 11:
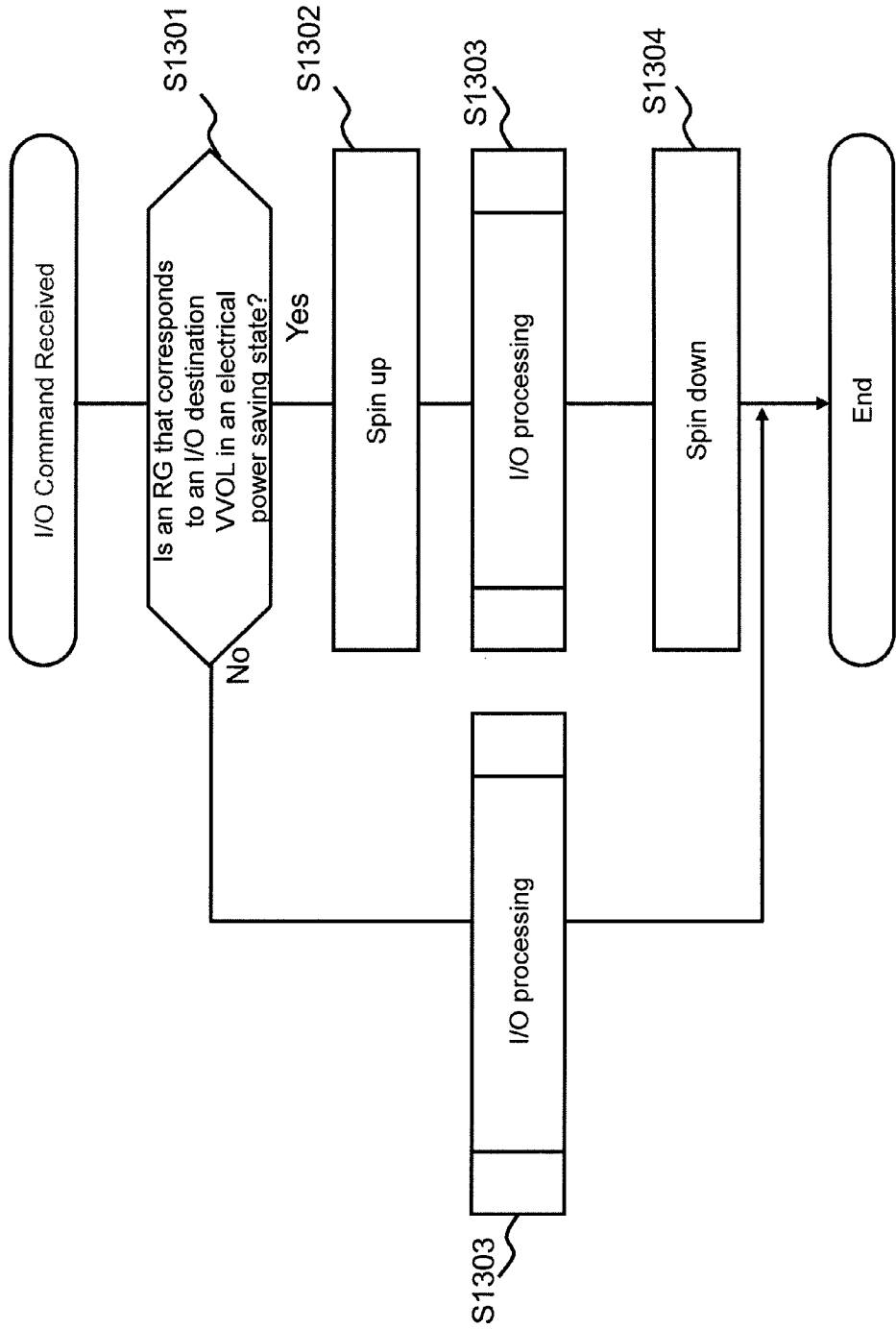
FIG. 11 shows a flow of a processing that is executed in the case in which an input/output (I/O) command is received from a host.

FIG. 11 shows a flow of a processing that is executed in the case in which an I/O command is received from a host.

Referring also to FIGS. 2 and 4, the CHA 111 receives an I/O command from the host 101. The CHA 111 transmits the I/O command to the MPPK 121. The MPPK 121 receives the I/O command, and executes an I/O control program 412, whereby the processing is executed.

S1301, the program 412 judges whether or not an RG 205 that is associated with an I/O destination VVOL (a VOL that is specified by the I/O command) is in an electrical power saving state (hereafter the RG 205 is referred to as a target RG in the descriptions of this flow). More specifically, the program 412 refers to the pool management table 402, and specifies an ID of at least one target RG that corresponds to an I/O destination VVOL for instance. Moreover, the program 412 refers to the RG management table 404, and judges whether or not there is a target RG in which a state is a spin down state in at least one target RG. In the case in which there is a target RG in a spin down state, the processing in the range from S1302 to S1304 is executed for the target RG. On the other hand, the processing of S1302 and S1304 is not executed for the target RG that is not in a spin down state, and an I/O processing of S1303 is executed.

The processing in the range from S1302 to S1304 will be described.

In the S1302, the program 412 makes each PDEV that configures a target RG in a spin down state to be in a spin up state. More specifically, the program 412 transmits an electrical power saving release request to each PDEV that configures a target RG in a spin down state, and registers a spin up state as a state of a target RG in the RG management table 404.

In the S1303, the program 412 executes an I/O processing. The I/O processing will be described later.

In the S1304, the program 412 makes a target RG that has been made to be in a spin up state in the S1302 to be in a spin down state again. More specifically, the program 412 transmits an electrical power saving request to each PDEV that configures a target RG in a spin up state, and registers a spin down state as a state of a target RG in the RG management table 404.

<I/O Processing>

Figure 12:
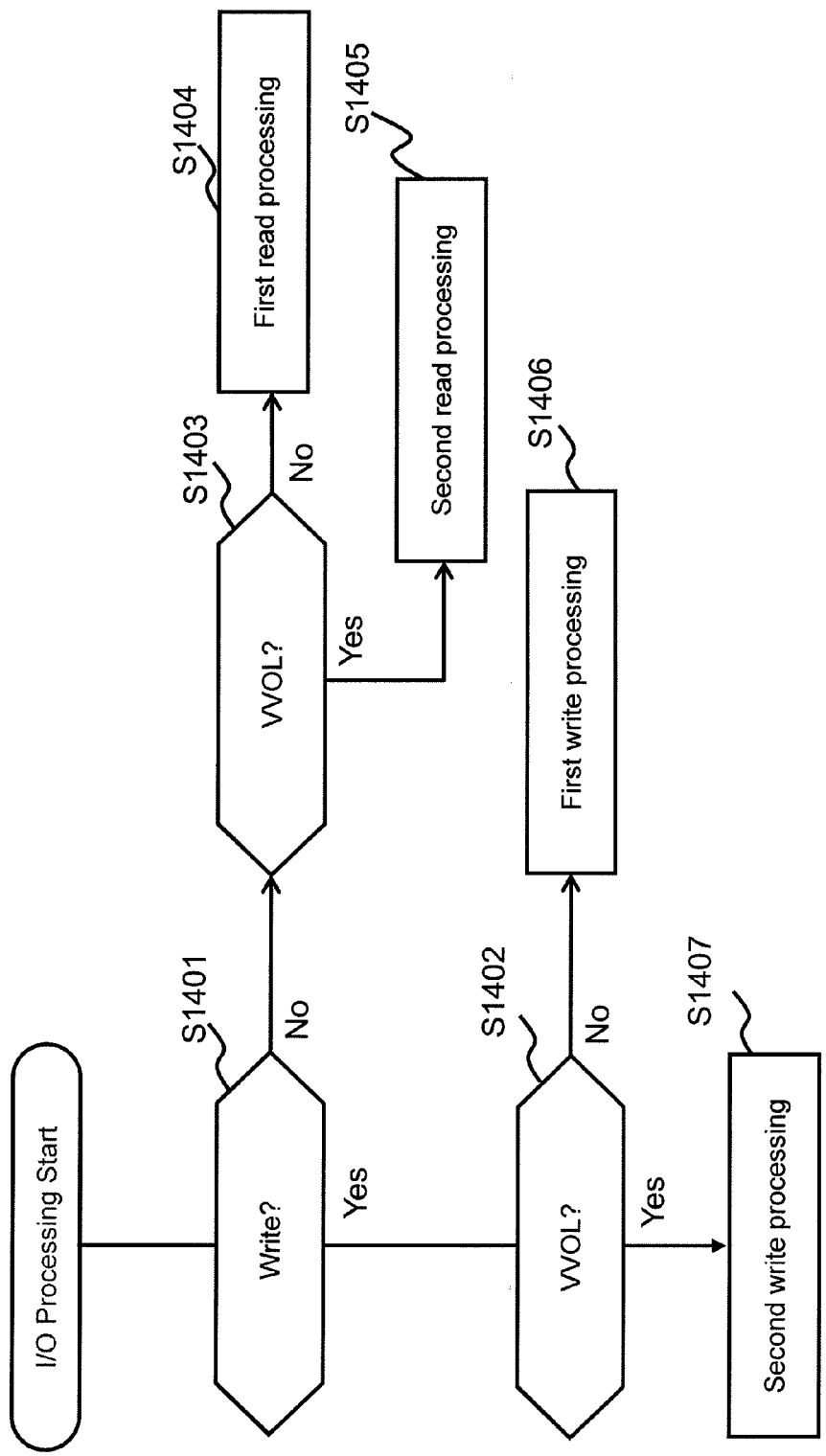
FIG. 12 shows a flow of an I/O processing.

FIG. 12 shows a flow of an I/O processing (the S1303 of FIG. 11).

In the S1401, the program 412 judges whether the I/O command is a write command or a read command. In the case in which the I/O command is a read command, the S1403 is executed.

In the S1403, the program 412 judges whether or not a read destination is a VVOL. In other words, the program 412 judges whether a read destination that is indicated by the I/O command is a VVOL of a TP system 103a or an RVOL of a normal system 103b (see FIG. 3).

In the case in which a read destination is an RVOL, the program 412 executes a first read processing in the S1404. In the first read processing, the program 412 complies with the read command and reads the read target data from an RVOL of a read destination.

In the case in which a read destination is a VVOL, the program 412 executes a second read processing in the S1405. The second read processing will be described later.

In the case in which the I/O command is a write command in the S1401, the S1402 is executed.

In the S1402, the program 412 judges whether or not a write destination is a VVOL.

In the case in which a write destination is an RVOL, the program 412 executes a first write processing in the S1406. In the first write processing, the program 412 complies with the write command and writes the write target data to an RVOL of a write destination.

In the case in which a write destination is a VVOL, the program 412 executes a second write processing in the S1407. The second write processing will be described later.

<Second Write Processing>

Figure 13:
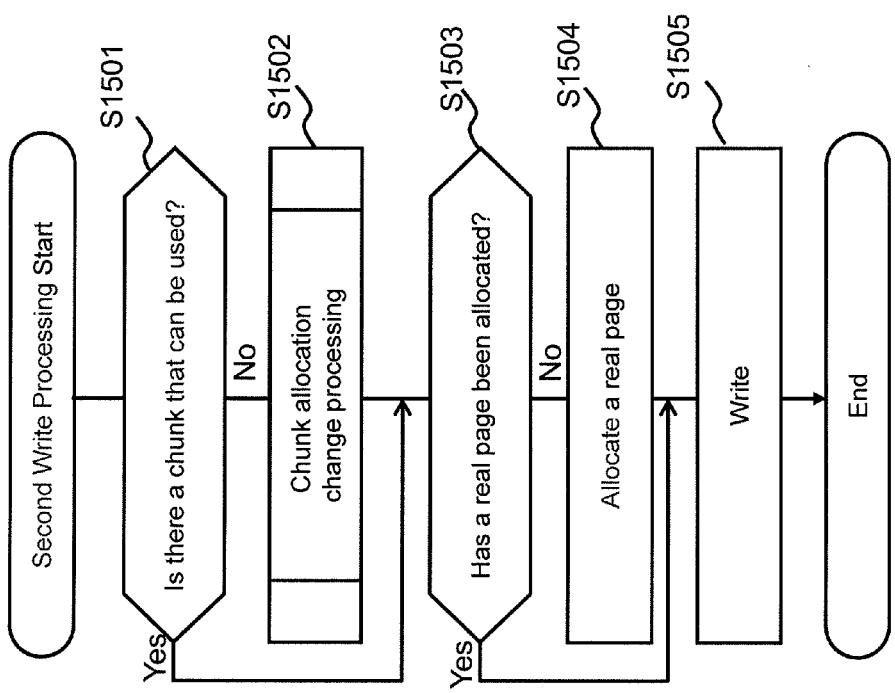
FIG. 13 shows a flow of a second write processing in the I/O processing of FIG. 12.

FIG. 13 shows a flow of a second write processing. In the S1501, the program 412 refers to the pool management table 402 (see FIG. 6), and extracts a POOL ID that corresponds to a VVOL of a write destination that is indicated by the write command. Moreover, the program 412 judges whether or not there is a chunk that can be used in a pool of a pool ID that has been extracted based on a chunk status that corresponds to the pool ID in the real page management table 406 (see FIG. 10). In the case in which there is a chunk that can be used, the S1503 is executed. In the case in which there is not a chunk that can be used, the S1502 is executed. Here, the "chunk that can be used" is a chunk in which a chunk state is "in use" and is a chunk that is provided with a free real page. The "chunk that can be used" is referred to as a target chunk in the following descriptions of FIG. 13.

In the S1502, the program 412 executes a chunk allocation change processing. The chunk allocation change processing will be described later. After the chunk allocation change processing is executed, the S1503 is executed.

In the S1503, the program 412 refers to the allocation table 405 (see FIG. 9), and judges whether or not a real page has been allocated to a write destination virtual page. In the case in which a real page has not been allocated to a write destination virtual page, the S1504 is executed. In the case in which a real page has been allocated to a write destination virtual page, the S1505 is executed.

In the S1504, the program 412 allocates a free real page in a target chunk to a write destination virtual page. More specifically, the program 412 executes the following processes:

(*) the program 412 refers to the real page management table 406 (see FIG. 10), and specifies a free real page that is included in a target chunk in a pool with which a write destination VVOL is associated;

(*) the program 412 registers an ID of a pool that is provided with the specified real page, an ID of the real page, and an ID of a tier that is provided with the real page as a pool ID, a real page ID, and a tier ID that correspond to a write destination virtual page; and (*) the program 412 updates a page status that correspond to the above specified real page to be "in use" in the real page management table 406.

In the S1505, the program 412 writes the write target data to a real page that has been allocated to the write destination virtual page.

<Chunk Allocation Change Processing>

Figure 14:
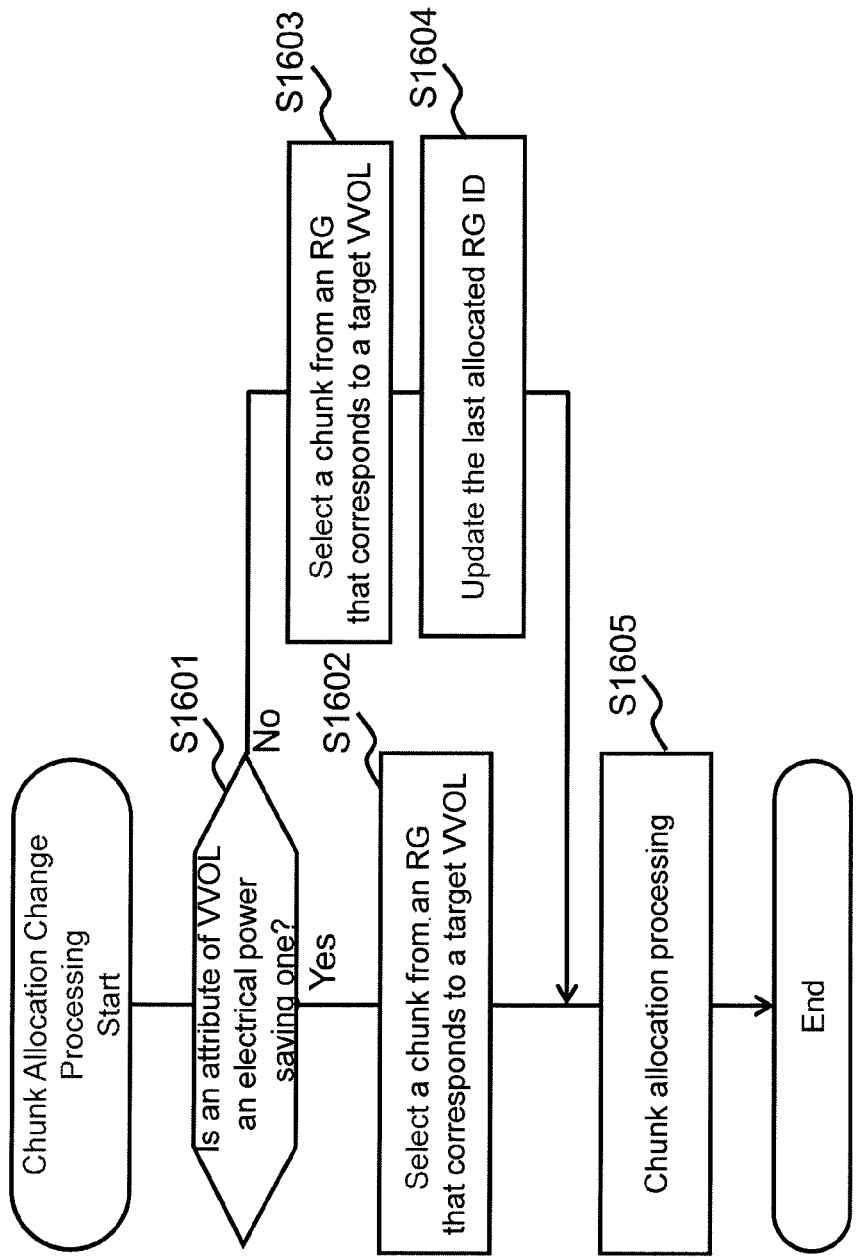
FIG. 14 shows a flow of a chunk allocation change processing.

FIG. 14 shows a flow of a chunk allocation change processing (a processing of the S1502 of FIG. 13).

In the S1601, the program 412 judges whether or not an attribute of a VVOL of the write destination is an electrical power saving attribute. More specifically, the program 412 refers to the VVOL management table 403, and judges whether a VVOL electrical power saving attribute that corresponds to a write destination VVOL is "with" or "without". In the case in which a VVOL electrical power saving attribute that corresponds to a write destination VVOL is "without", the S1603 is executed. In the case in which a VVOL electrical power saving attribute that corresponds to a write destination VVOL is "with", the S1602 is executed.

In the S1603, the program 412 selects a free chunk based on RG that corresponds to a write destination VVOL. More specifically, the program 412 refers to the VVOL management table 403, and specifies a last allocated RG ID that corresponds to a write destination VVOL. Moreover, the program 412 refers to the pool management table 402, and selects an RG ID next to a last allocated RG ID. The program 412 then selects a free chunk that corresponds to the selected RG ID from the real page management table 406.

In the S1604, the program 412 updates a last allocated RG ID of the VVOL management table 403 to the above selected RG ID (an RG ID next to a last allocated RG ID).

In the S1602, the program 412 selects a free chunk based on RG that corresponds to a target VVOL. More specifically, the program 412 refers to the VVOL management table 403, and specifies a last allocated RG ID that corresponds to a target VVOL. The program 412 then selects a free chunk that corresponds to the specified RG ID from the real page management table 406.

In the S1605, the program 412 executes a chunk allocation processing and allocates a chunk that has been selected in the S1602 or the S1603 to a write destination VVOL. By this configuration, the chunk becomes the latest allocated chunk for the write destination VVOL. After that, every time an unallocated virtual page for a VVOL of a allocated destination of the chunk becomes a write destination, a free real page is allocated from the chunk.

<Second Read Processing>

Figure 15:
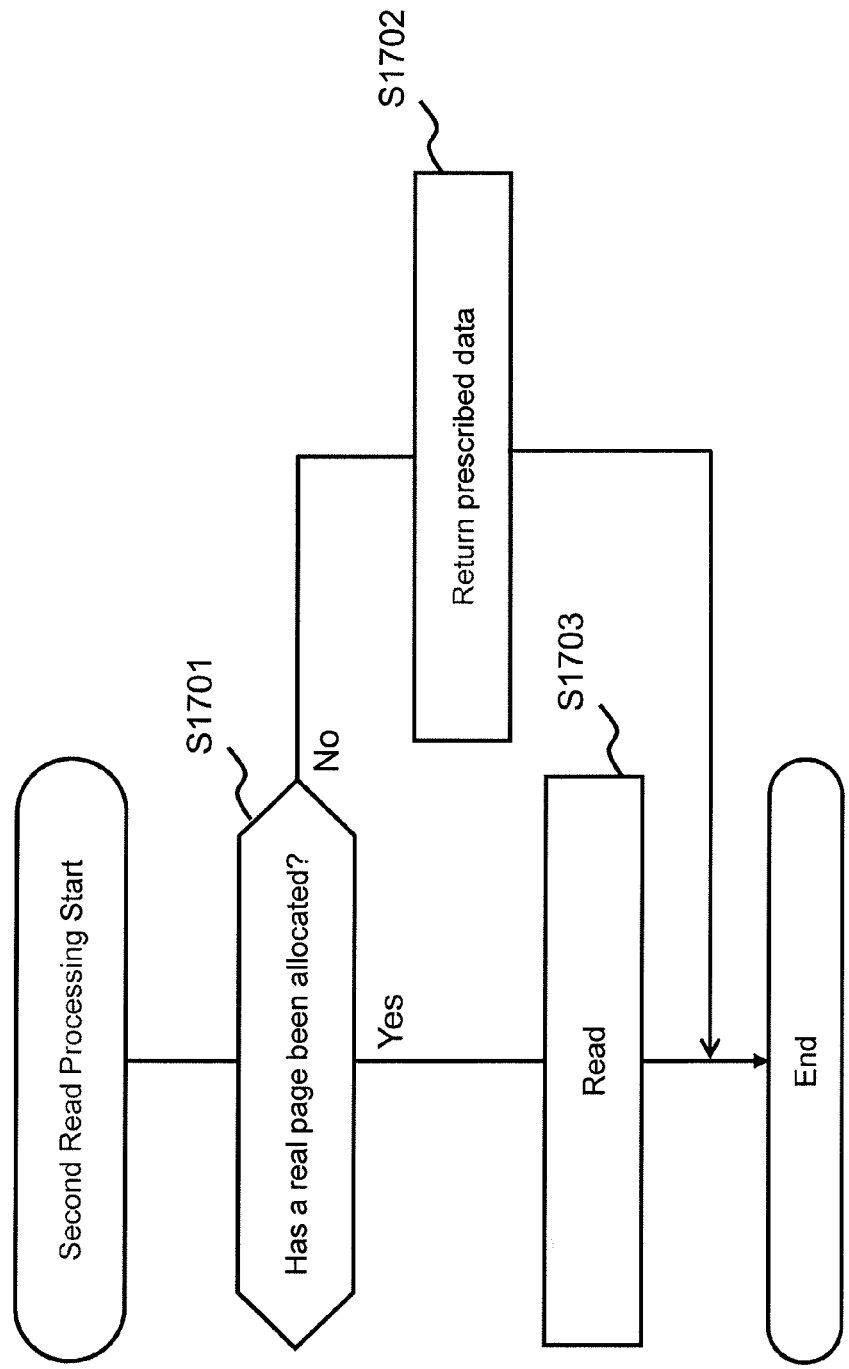
FIG. 15 shows a flow of a second read processing in the I/O processing of FIG. 12.

FIG. 15 shows a flow of the second read processing. The second read processing is a processing of the S1405 in FIG. 12.

In the S1701, the program 412 judges whether or not a real page has been allocated to a virtual page of the read destination (a virtual page to which an address that is specified by the read command belongs). More specifically, the program 412 refers to the allocation table 405 (see FIG. 9), and judges whether or not a real page ID has been allocated to an ID of a virtual page of the read destination. In the case in which a real page has not been allocated to the ID of a virtual page of the read destination, the S1702 is executed. In the case in which a real page has been allocated to the ID of a virtual page of the read destination, the S1703 is executed.

In the S1702, the program 412 returns the prescribed data to the host 101. The prescribed data is data in which all bits are set as 0.

In the S1703, the program 412 reads data from a real page to which a virtual page of the read destination has been allocated, and transmits the data to the host 101.

<VVOL Creation Processing>

Figure 16:
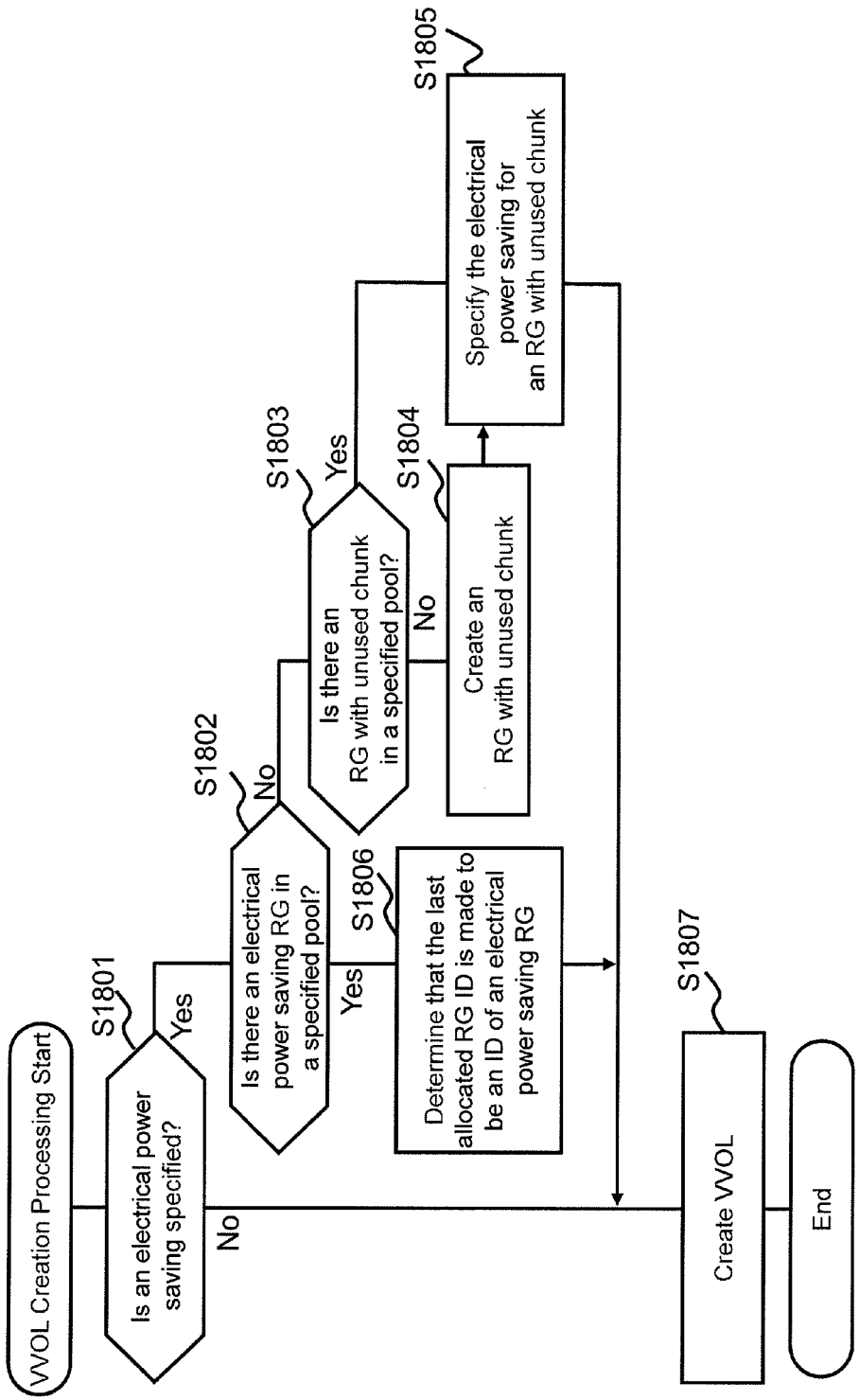
FIG. 16 shows a flow of a VVOL creation processing.

FIG. 16 shows a flow of a VVOL creation processing. In the descriptions of the <VVOL creation processing>, a VVOL that is newly created in the VVOL creation processing is referred to as a target VVOL.

The UI control program 411 receives a VVOL creation request from a manager via the management apparatus 107. For instance, in the case in which a manager input a prescribed item to a VVOL definition screen 1900 shown in FIG. 17 (for instance, a GUI (Graphical User Interface) that is indicated on the management apparatus 107), the management apparatus 107 creates a VVOL creation request.

Figure 17:
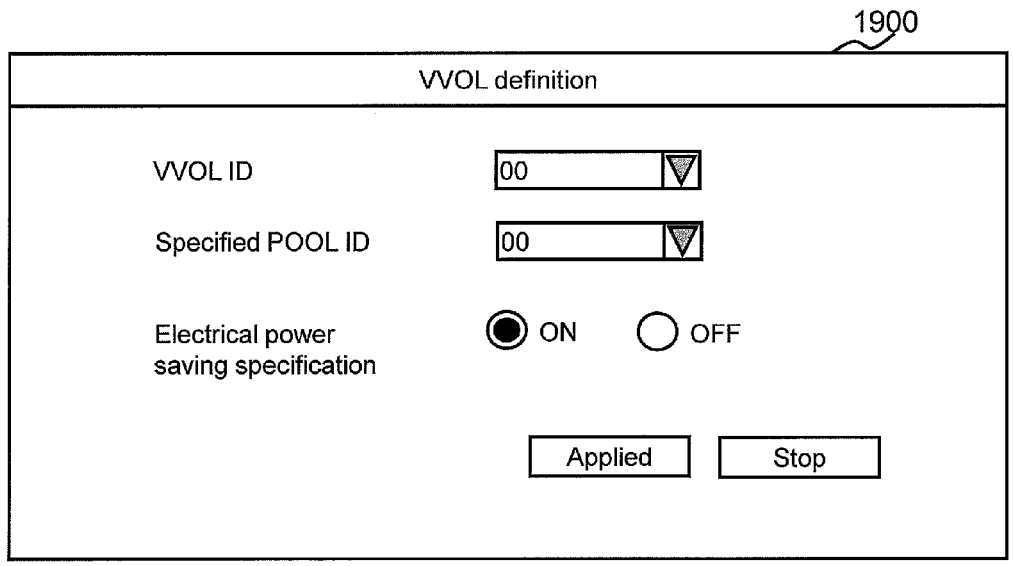
FIG. 17 shows a VVOL definition graphical user interface (GUI) 1900.

In the VVOL definition screen 1900 shown in FIG. 17, an ID of a target VVOL, a specified POOL ID, the existence or nonexistence of an electrical power saving specification of a target VVOL can be specified.

In the S1801 (FIG. 16), the program 411 judges whether or not an electrical power saving has been specified for a target VVOL via the VVOL definition screen 1900. In the case in which an electrical power saving has been specified, the S1802 is executed. In the case in which an electrical power saving has not been specified, the S1807 is executed.

In the S1802, the program 411 judges whether or not there is an electrical power saving RG in a plurality of RGs that are basis of a specified pool. More specifically, the program 411 refers to the pool management table 402, and specifies a plurality of RGs that are basis of a specified pool. Moreover, the program 411 judges whether or not there is an RG in which an RG electrical power saving attribute is "with" (the table 404: FIG. 8) in the plurality of specified RGs. In the case in which there is an RG in which an RG electrical power saving attribute is "with" as a result of the judgment, the processing of S1806 is executed. On the other hand, in the case in which there is not an RG in which an RG electrical power saving attribute is "with" as a result of the judgment, the processing of S1803 is executed.

In the S1803, the program 411 judges whether or not there an RG in which a chunk is unused in a plurality of RGs that are basis of a specified pool. More specifically, the program 411 refers to the RG management table 404 (see FIG. 8), and judges whether or not there is an RG in which the number of used chunks is zero in a plurality of RGs that are basis of a specified pool. In the case in which there is an RG in which a chunk is unused as a result of the judgment, the processing of S1805 is executed. On the other hand, in the case in which there is not an RG in which a chunk is unused as a result of the judgment, the processing of S1804 is executed.

In the S1804, the program 411 creates an RG in which a chunk is unused. More specifically, the program 411 executes the following processes:

(*) the program 411 refers to the real page management table 406 (see FIG. 10), and selects one RG that is a basis of a specified pool;

(*) the program 411 refers to the real page management table 406, and specifies a real page in use;

(*) the program 411 executes a migration processing for each specified real page; and (*) the program 411 updates the number of used chunks of the selected RG is to be zero in the RG management table 404.

By the above configuration, the selected RG becomes an RG in which a chunk is unused. The RG in which a chunk is unused is (1) an RG that belongs to a tier having a lowest priority order, (2) an RG in which the number of real pages in use is smallest, or (3) an RG in which the power consumption is largest in a plurality of RGs that are a basis of a specified pool.

In the above migration processing, the program 411 executes the following processes:

(*) the program 411 moves data in a real page in use based on the above selected RG (a real page of a moving source) to a free real page based on another RG that is a basis of a specified pool (a real page of a move destination); and (*) the program 411 allocates a real page of a move destination as substitute for a real page of a moving source to a virtual page to which a real page of a moving source has been allocated.

The real page of a move destination can be a real page in a latest allocated chunk for a VVOL that is provided with a virtual page to which a real page of a moving source has been allocated.

In the S1805, the program 411 specifies the electrical power saving for an RG in which a chunk is unused. More specifically, the program 411 updates an RG electrical power saving specification for an RG in which a chunk is unused to be "with" in the RG management table 404 (see FIG. 8).

In the S1806, the program 411 determines that an ID of an electrical power saving RG is made to be the last allocated RG ID that corresponds to a target VVOL. As described before, a real page based on the prescribed electrical power saving RG that corresponds to the VVOL (an RG that is specified by the last allocated RG ID that corresponds to the VVOL) is allocated to a VVOL of an electrical power saving specification on a constant basis. Consequently, a real page based on an electrical power saving RG is allocated to a target VVOL by the S1806.

In the S1807, the program 411 creates a target VVOL. More specifically, the program 411 registers the information related to a target VVOL to the pool management table 402 (see FIG. 6), the VVOL management table 403 (see FIG. 7), the RG management table 404 (see FIG. 8), and the allocation table 405 (see FIG. 9). More specifically, in the case of YES in the S1801 for instance, the program 411 registers "with" as the VVOL electrical power saving attribute of a target VVOL in the VVOL management table 403 (see FIG. 7). Moreover, in the case in which the S1806 is executed for instance, the program 411 registers an ID that has been determined in the S1806 as the last allocated RG ID in the VVOL management table 403 (see FIG. 7).

<Display Screen>

Figure 18:
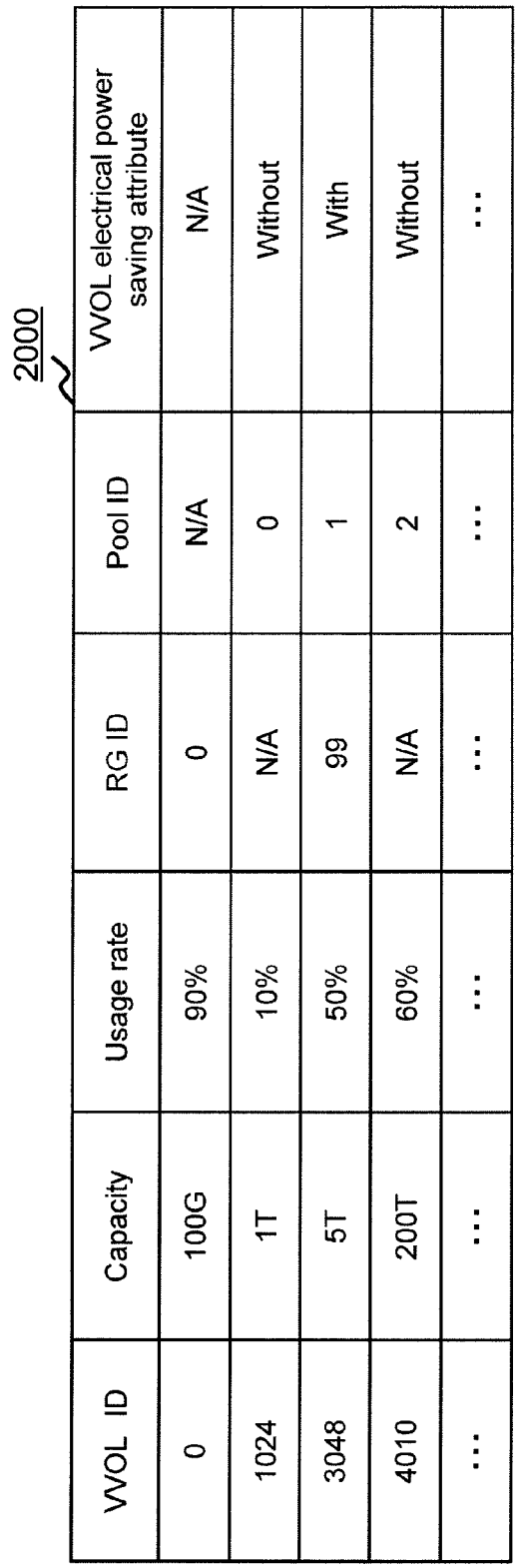
FIG. 18 shows information that is indicated on a management apparatus 107.

FIG. 18 shows the VVOL management information 2000 that is indicated on a management apparatus.

The VVOL management information 2000 includes a VVOL ID, a capacity, a usage rate, an RG ID, a POOL ID, and a VVOL electrical power saving attribute for every VVOL. A capacity of a VVOL is calculated by a multiplication of the total number of pages of a VVOL and a capacity of one virtual page. A usage rate of a VVOL is a rate of the number of allocated pages of a VVOL to the total number of pages of a VVOL. An RG ID is an ID of an electrical power saving RG for a VVOL for instance, and is indicated as "N/A" in the case in which there is not an electrical power saving RG for a VVOL. An ID of a VVOL in which a pool ID is "N/A" is an ID of an RVOL that is recognized by the host. Although this is not shown, as the information that is stored into the CMPK 119, the information related to an RVOL that is recognized by the host (for instance, a capacity of an RVOL, an ID of an RG that is a basis of an RVOL, and an electrical power saving attribute of the RG being "with" or "without") can be mentioned regardless of the tables of a variety of kinds described before.

The VVOL management information 2000 can also include information of other kinds that can be specified based on the tables of a variety of kinds described before as substitute for or in addition to the information of the kinds shown in FIG. 18.

<Electrical Power Saving Configuration Change Processing>

Figure 19:
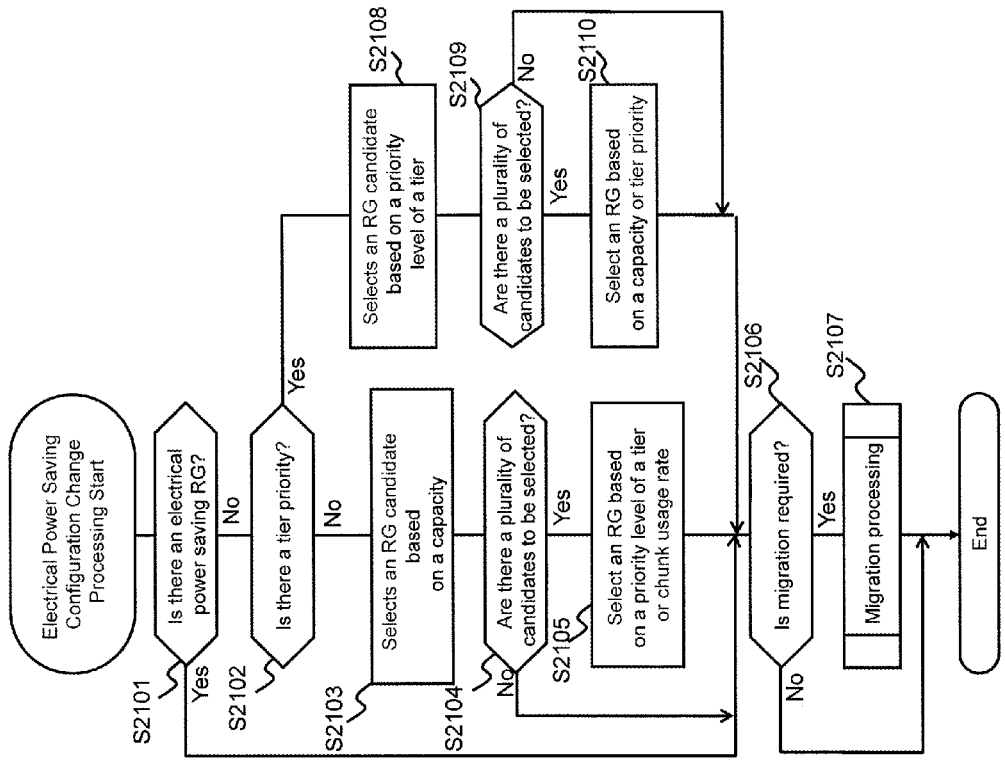
FIG. 19 shows a flow of an electrical power saving configuration change processing.

FIG. 19 shows a flow of an electrical power saving configuration change processing.

In the case in which the electrical power saving control program 413 receives an electrical power saving request that specifies a VVOL from the host 101 (or the management apparatus 107), the electrical power saving control program 413 executes the following processes. A VVOL that is specified by an electrical power saving request has a VVOL electrical power saving attribute (see FIG. 7) of "without" most commonly. In the descriptions of FIG. 19, a VVOL that is specified by an electrical power saving request is referred to as a target VVOL.

In the S2101, the program 413 judges whether or not there an electrical power saving RG in a plurality of RGs that are basis of a pool with which a target VVOL is associated. More specifically, the program 413 executes the following processes:

(*) the program 413 refers to the pool management table 402 (see FIG. 6), and specifies a plurality of RGs that are basis of a pool with which a target VVOL is associated; and (*) the program 413 refers to the RG management table 404 (see FIG. 8), and judges whether or not there is an RG in which an RG electrical power saving attribute is "with" in a plurality of the above specified RGs.

In the case in which there is an RG in which an RG electrical power saving attribute is "with" as a result of the judgment, the processing of S2106 is executed. On the other hand, in the case in which there is not an RG in which an RG electrical power saving attribute is "with" as a result of the judgment, the processing of S2102 is executed. In the case in which there is an RG in which an RG electrical power saving attribute is "with", the program 413 updates a flag that corresponds to the RG (a flag in the RG management table 404) to be "OFF".

In the S2102, the program 413 refers to the VVOL management table 403 (see FIG. 7), and judges whether "ON" or "OFF" is set to a tier priority that corresponds to a target VVOL. In the case in which a tier priority is "ON" as a result of the judgment (Yes in S2012), the processing of S2108 is executed. On the other hand, in the case in which a tier priority is "OFF" as a result of the judgment (No in S2012), the processing of S2103 is executed. The processing in the case in which a tier priority is "ON" will be described first.

<Processing in the Case in which a Tier Priority is "ON" (S2108 to S2110)>

In the S2108, the program 413 selects an electrical power saving RG candidate based on a priority level of a tier. More specifically, the program 413 refers to the tier definition table (see FIG. 5), and determines a priority level that corresponds to a type of a tier. For instance, a priority level that corresponds to a type of a tier can be SATA>SAS>SSD in the order of a lower performance (in the order of a lower speed of an RG), or can be SAS>SATA>SSD in the order of a higher power consumption of an RG. The program 413 selects an RG that belongs to a tier having the highest priority level as an electrical power saving RG candidate. Hereafter, in the descriptions of the processing in S2110, a selected electrical power saving RG candidate is referred to as a selected RG candidate.

The guiding principle of a priority level can be determined by a user without any inhibition. For instance, a priority level can be determined based on power consumption and/or a performance of a PDEV that configures an RG.

In the S2109, the program 413 judges whether there is one selected RG candidate or there is a plurality of selected RG candidates. In the case in which there is one selected RG candidate (the selected RG candidate is referred to as a target RG in the descriptions of FIG. 19), the processing of S2106 is executed. On the other hand, in the case in which there are a plurality of selected RG candidates, the processing of S2110 is executed in order to determine a target RG (that is, in order to select one RG from a plurality of selected RG candidates).

In the S2110, the program 413 determines one selected RG candidate as a target RG based on a capacity of each of selected RG candidates from a plurality of selected RG candidates. An RG in which the total number of chunks is smallest (that is, an RG in which the amount of free real pages is smallest) is determined as a target RG. In the case in which there are a plurality of selected RG candidates in which the total number of chunks is smallest, an RG in which a chunk usage rate is smallest (that is, an RG in which a total amount of data that must be moved to another RG is small) is selected as a target RG from the plurality of selected RG candidates. More specifically, the program 413 executes the following processes:

(*) the program 413 refers to the RG management table 404, and selects an RG in which the total number of chunks is smallest from the plurality of selected RG candidates (hereafter, in the descriptions of the processing in S2110, a selected RG candidate is simply referred to as an RG candidate);

(*) in the case in which there is one RG candidate, the RG candidate is determined as a target RG; and (*) in the case in which there are a plurality of RG candidates, a usage rate of a chunk of each of the RG candidates (=(the number of used chunks/the total number of chunks)×100(%)) is calculated, an RG candidate in which the calculated chunk usage rate is smallest is determined as a target RG.

In the S2110, the program 413 can execute the following (X):

(X) the program 413 judges whether or not a total amount of data in a target VVOL is smaller than a total amount of at least one free real page that is included in a selected RG candidate in which the total number of chunks is smallest based on the RG management table 404 and the allocation table 405. In the case in which a result of the judgment is negative, the processing of the S2110 can be completed. On the other hand, in the case in which a result of the judgment is positive, the program 413 can execute the following processing of (a) or (b). The processing (a) is a processing in which a preference is given to a priority level of a tier, and the processing (b) is a processing in which a preference is given to a capacity of an RG.

a. the program 413 searches an RG in which a total amount of free real pages is equal to or larger than a total amount of data in a target VVOL from a plurality of selected RG candidates that belong to a tier in which a priority level is highest. In the case in which such an RG is found, the program 413 determines the RG as a target RG. On the other hand, in the case in which such an RG is not found, the program 413 searches such an RG from a plurality of selected RG candidates that belong to a tier in which a priority level is as higher as possible.

b. the program 413 can execute the following processes:

(b1) the program 413 selects an RG in which the total number of chunks is smallest from a plurality of selected RG candidates that belong to a tier in which a priority level is next lower than that of the last time;

(b2) in the case in which there is one RG in such a pattern, the RG is determined as a target RG;

(b3) in the case in which there is a plurality of RGs in such a pattern, an RG in which a chunk usage rate is smallest is selected as a target RG from the plurality of RGs;

(b4) the program 413 executed the above judgment (X) for the selected target RG;

(b5) in the case in which a result of the judgment is positive, the processing of the S2110 is completed; and (b6) in the case in which a result of the judgment is negative, the above (b1) is executed.

<Processing in the Case in which a Tier Priority is "OFF" (S2103 to S2105)>

In the 2103, the program 413 selects one RG based on a capacity of each of a plurality of RGs from a plurality of RGs that are basis of a pool with which a target VVOL is associated. An RG in which the total number of chunks is smallest (that is, an RG in which the amount of free real pages is smallest) is selected. In the case in which there are a plurality of RGs in which the total number of chunks is smallest, an RG in which a chunk usage rate is smallest (that is, an RG in which a total amount of data that must be moved to another RG is small) is selected from the plurality of RGs. More specifically, the program 413 executes the following processes:

(*) the program 413 refers to the RG management table 404, and selects an RG in which the total number of chunks is smallest from the plurality of RGs that are basis of a pool with which a target VVOL is associated (hereafter, in the descriptions of the processing in the case in which a tier priority is "OFF" (S2103 to S2105), a selected RG is referred to as a selected RG candidate);

(*) in the case in which there is one selected RG candidate, the selected RG candidate is determined as an RG candidate; and (*) in the case in which there are a plurality of selected RG candidates, a usage rate of a chunk of each of the RG candidates (=(the number of used chunks/the total number of chunks)×100(%)) is calculated, a selected RG candidate in which the calculated chunk usage rate is equal to or less than a prescribed threshold value is determined as an RG candidate.

In the S2104, the program 413 judges whether there is one RG candidate or there is a plurality of RG candidates. In the case in which there is one RG candidate, the RG candidate is a target RG and the processing of S2106 is then executed. On the other hand, in the case in which there is a plurality of RG candidates, the processing of S2105 is executed in order to determine a target RG.

In the S2105, the program 413 determines a target RG based on a priority level of a tier. More specifically, similarly to the S2108, the program 413 refers to the tier definition table (see FIG. 5), and determines a priority level that corresponds to a type of a tier. For instance, a priority level that corresponds to a type of a tier can be SATA>SAS>SSD in the order of a lower performance (in the order of a lower speed of an RG), or can be SAS>SATA>SSD in the order of a higher power consumption of an RG. The program 413 selects one RG that belongs to a tier having the highest priority level from a plurality of RG candidates. The selected RG candidate is a target RG. In the case in which there is a plurality of RG candidates that belong to a tier having the highest priority level, an RG candidate in which a chunk usage rate is smallest can be determined as a target RG.

(Judgment of Necessity of Migration)

In the S2106, the program 413 judges whether or not a migration processing is required for a target RG. More specifically, the program 413 executes the following processes: a. the program 413 judges whether or not there is a real page in use based on a target RG; and b. in the case in which a result of the judgment of the above (a) is positive, the program 413 judges whether or not all real pages in use based on a target RG are allocated to a target VVOL.

In the case in which a result of the judgment of the above (a) is negative or a result of the judgment of the above (b) is positive, a migration processing is not required. In the case in which a migration processing is not required, an electrical power saving configuration change processing (a processing of FIG. 19) is completed. On the other hand, in the case in which a result of the judgment of the above (b) is negative, data in a VVOL other than a target VVOL is stored in a target RG, and a migration processing is required. In this case, a migration processing is executed in the processing of S2107.

(Migration Processing)

In the S2107, the program 413 executes a migration processing. More specifically, in the case in which a real page that is allocated to in a VVOL other than a target VVOL is in a target RG, the program 413 executes the following process of (A). In the case in which the following process (A) is executed and a real page that is allocated to in a VVOL other than a target VVOL is in an RG other than a target RG, the program 413 executes the following process of (B). After the program 413 completed the following process of (A) and the following process of (B), the program 413 executes the process of (C).

The following processes (a1) to (a3) are executed: (a1) the program 413 moves data in a real page that is allocated to a VVOL other than a target VVOL (a real page that is included in a target RG) to a free real page based on an RG other than a target RG (an RG in which an RG electrical power saving attribute is "without" and that is a basis of a pool with which a target VVOL is associated); (a2) the program 413 updates the allocation table 405 in such a manner that a real page of a move destination as substitute for a real page of a move source is allocated to a virtual page to which a real page of a moving source is allocated in the process (a1); and (a3) the program 413 updates the real page management table 406 in such a manner that a real page of a moving source is made to be free in the process (a1) and a real page of a moving destination is in use in the process (a1).

(B) The following processes (b1) to (b3) are executed: (b1) the program 413 moves data in a real page that is allocated to in a target VVOL (a real page that is included in an RG other than a target RG) to a free real page based on a target RG; (b2) the program 413 updates the allocation table 405 in such a manner that a real page of a movedestination as substitute for a real page of a movesource is allocated to a virtual page to which a real page of a moving source is allocated in the process (b1); and (b3) the program 413 updates the real page management table 406 in such a manner that a real page of a moving source is made to be free in the process (b1) and a real page of a movedestination is in use in the process (b1).

(C) The program 413 updates a VVOL electrical power saving attribute of a target VVOL to be "with" in the VVOL management table 403 (see FIG. 7). Moreover, in the case in which the RG electrical power saving attribute is "without" in the RG management table 404 (see FIG. 8), the program 413 changes an RG electrical power saving attribute to be "with".

In addition, the program 413 updates a flag that corresponds to a target RG from "OFF" to "ON".

In the S2107, the program 413 can judge whether or not a free real page having a total capacity equal to or large than a total amount of data in a target VVOL exists in a target RG (an electrical power saving RG) based on the RG management table 404 and the allocation table 405 on the assumption that data in a VVOL other than a target VVOL is moved from a target RG (an electrical power saving RG). In the case in which a result of the judgment is positive, the program 413 can move the data in which a write time is relatively in the past (relatively old data) among all data in a target VVOL to a target RG (an electrical power saving RG), and can move the data in which a write time is relatively less in the past (relatively new data) to a storage area other than a target RG (an electrical power saving RG) (another RG that is a basis of a pool with which a target VVOL is associated (an RG in which the RG electrical power saving attribute is "without")).

<Spin Down Processing>

Figure 20:
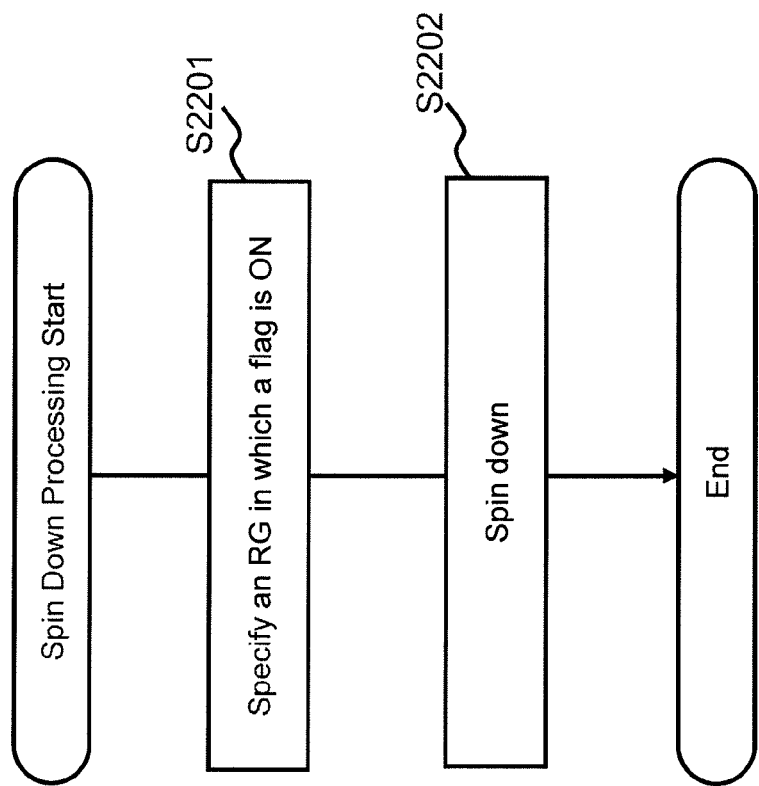
FIG. 20 shows a spin down processing.

FIG. 20 shows a flow of a spin down processing.

In the S2201, the program 413 refers to an RG management table (see FIG. 8), and specifies an RG in which a flag is ON.

In the S2202, the program 413 makes all PDEVs that configure the specified RG spin down (makes all PDEVs that configure the specified RG to be in an electrical power saving state). Moreover, the program 413 updates a state that corresponds to the specified RG (a state in the RG management table 404) from "spin up" to "spin down".

The embodiment in accordance with the present invention has been described above. In accordance with the present invention, in the case in which a VVOL that is an electrical power saving target (hereafter referred to as a target VVOL in this paragraph) is specified from the host 101 (or the management apparatus 107), the following processes (x) and (y) are executed: (x) in the case in which data in a target VVOL is in an RG other than an electrical power saving RG (an RG in which an RG electrical power saving attribute is "with"), the data is moved to the electrical power saving RG; and (y) in the case in which data in a VVOL other than a target VVOL is in an electrical power saving RG, the data is moved to a storage area other than an electrical power saving RG (for instance, an RG other than an electrical power saving RG).

By the above configuration, even in the case in which an I/O command that specifies a VVOL other than a target VVOL is received when an electrical power saving RG is in an electrical power saving state, it is not necessary to release an electrical power saving state since a storage area of an I/O destination (for instance, an RG) is not an electrical power saving state.

Moreover, data that is stored in an electrical power saving RG is only data in an electrical power saving VVOL. The electrical power saving VVOL is a VVOL that is specified by an electrical power saving request. Such a VVOL is a VVOL that is not specified by an I/O command for a certain period of time or more for instance. From this point of view, a frequency of a release of an electrical power saving state of an electrical power saving RG can be suppressed.

While the preferred embodiment in accordance with the present invention has been described above, the embodiment is an example for describing the present invention, the scope of the present invention is not restricted to the embodiment, and various changes, modifications, and functional additions can be thus made without departing from the scope of the present invention.

For instance, it is not necessary that a chunk exists in a pool. For instance, an RVOL that is recognized by a host (a normal RVOL) and an RVOL that configures a pool (a pool RVOL)

can be mixed in a plurality of RVOLs based on one RG. In the case in which an RG electrical power saving attribute of an RG in which a normal RVOL and a pool RVOL are mixed (hereafter referred to as a mixed RG) is made to be "with", program 413 may make the mixed RG spin down state if all normal RVOLs based on the mixed RG are power saving target.

Moreover, in the case in which a total amount of data in an electrical power saving VVOL is larger than a capacity of one electrical power saving RG (an RG in which an RG electrical power saving attribute is "with") by increasing the number of electrical power saving VVOLs for instance, any one of the following processes (a) and (b) can be executed: (a) the program 413 adds an RG having a capacity equal to or larger than a total amount of data in all electrical power saving VVOLs to a present electrical power saving RG to make a new electrical power saving RG; and (b) the program 413 makes another RG (an RG that is a basis of a pool with which an electrical power saving VVOL is associated) to be an electrical power saving RG in addition to one electrical power saving RG in such a manner that the RG has a total capacity equal to or larger than a total amount of data in all electrical power saving VVOLs.

An electrical power saving RG can be determined by a manager in such a manner that at least one RG of a plurality of RGs is an electrical power saving RG when a pool comprised of the plurality of RGs is created.

Moreover, an electrical power saving VVOL can be a VVOL that satisfies the prescribed conditions as substitute for or in addition to a VVOL that is specified by an electrical power saving request. For instance, the program 413 can determine a VVOL that is not specified as an I/O destination for a certain period of time as an electrical power saving VVOL.

Even in the case in which a result of a judgment of the S2101 is positive in FIG. 19 for instance, the S2102 and subsequent processes can also be executed in order to newly make any RG to be an electrical power saving RG as substitute for or in addition to an existing electrical power saving RG in the case in which the total capacity of a real page that is included in an existing electrical power saving RG is less than the total capacity of all data in a new target VVOL.

Moreover for instance, in the case in which an electrical power saving RG is determined, an RG in which the number of unused chunks is equal to or larger than a prescribed threshold value even if data in an electrical power saving VVOL is aggregated can also be determined as an electrical power saving RG. In this case, a prescribed threshold value can be determined based on an increased amount of data that is written to an electrical power saving VVOL (an amount of data that is written in a unit time). A write target data accompanying a write command that specifies an electrical power saving VVOL is written to an electrical power saving RG on a consistent basis. This is because a last allocated RG ID that corresponds to an electrical power saving VVOL is fixed as described above.

REFERENCE SIGNS LIST

103: Storage system, 101: Host, 105: PDEV, 107: Management apparatus, 111: CHA, 113: DKA, 117: SW, 119: CMPK, 121: MPPK, 203: VVOL, 205: RVOL, 207: Virtual page, 209: Real page, 301: RG

The invention claimed is:

1. A storage system that is coupled to at least one host, comprising:
a plurality of Redundant Array of Independent Disks (RAID) groups; and
a controller that is coupled to the plurality of RAID groups and the at least one host,
wherein each of the plurality of RAID groups is configured by at least two physical storage devices,
the plurality of RAID groups is a basis of a pool that is a storage area that is configured by a plurality of real areas,
the controller provides a plurality of virtual volumes that are associated with the pool to the at least one host,
each of the virtual volumes is a virtual logical volume that is configured by a plurality of virtual areas, and
in the case in which the controller receives a write command from the at least one host, the controller specifies a virtual area of a write destination from the write command, allocates a free real area of the pool to the specified virtual area of the write destination, and writes write target data accompanying the write command to the allocated free real area,
(A) wherein in performing an electrical power saving processing, the controller specifies a first virtual volume (VVOL) that is a virtual volume of an electrical power saving target,
(B) the controller specifies a first RAID group (RG) that is a RAID group of the electrical power saving target,
(C) the controller judges whether or not there is a first real area that is allocated to a second VVOL that is a virtual volume other than the first VVOL and that is a real area based on the first RG,
(D) in the case in which the result of the judgment in (C) is positive, the controller moves data in the first real area to a free real area based on a second RG that is a RAID group other than the first RG, and executes a first moving processing in which a real area based on the second RG, is allocated, as a substitute for the first real area to a virtual area to which the first real area is allocated, and
(E) the controller sets all physical storage devices that configure the first RG to be in an electrical power saving state in the case in which there is no real area based on the first RG that is allocated to the second VVOL; and
wherein the controller selects the first RG from the plurality of RAID groups based on a capacity of the selected first RG being smaller than a capacity of other RGs of the plurality of RAID groups.

2. The storage system according to claim 1, wherein:
(F) the controller judges whether or not there is a second real area that is allocated to the first VVOL and that is a real area based on the second RG,
(G) in the case in which the result of the judgment in (F) is positive, the controller moves data in the second real area to a free real area based on the first RG, and executes a second moving processing in which a real area based on the first RG group, is allocated, as a substitute for the second real area, to a virtual area to which the second real area is allocated, and
in (E), the controller sets all physical storage devices that configure the first RG to be in an electrical power saving state in the case in which there no real area based on the first RG that is allocated to the second VVOL and there is no real area based on the second RG that is allocated to the first VVOL as a real area based on the second RG.

3. The storage system according to claim 2, wherein:
each of the real areas that configure the pool belongs to any tier of a plurality of tiers,
the controller is provided with a storage resource,
the storage resource stores volume management information that includes, for every virtual volume, information that indicates whether a preference is given to a priority level of a tier or the total amount of real areas of a RAID group, in (B):
  (b1) in the case in which the controller specifies that a preference is given to a priority level of a tier for the first VVOL based on the volume management information, the controller specifies a RAID group that belongs to a tier in which a priority level is highest; and
  (b2) in the case in which the controller specifies that a preference is given to the total amount of real areas of a RAID group for the first VVOL based on the volume management information, the controller specifies a RAID group in which the total amount of real areas is smallest, and a RAID group that is specified in (b1) or (b2) is the first RG.

4. The storage system according to claim 3, wherein:
in (b1), in the case in which there is a plurality of RAID groups that belong to a tier in which a priority level is highest, the controller specifies a RAID group in which the total amount of real areas is smallest in the plurality of RAID groups, and
in (b2), in the case in which there is a plurality of RAID groups in which the total amount of real areas is smallest, the controller specifies a RAID group that belongs to a tier in which a priority level is highest in the plurality of RAID groups.

5. The storage system according to claim 4, wherein:
the specified RAID group is a RAID group in which a percentage of the number of allocated real areas in the total amount of real areas is equal to or less than a prescribed threshold value.

6. The storage system according to claim 5, wherein:
in the case in which a write command that specifies the first VVOL is received and a write destination is an unallocated virtual area,
the controller executes the following processes on a constant basis:
(H) releases an electrical power saving state on a temporary basis in the case in which the first RG is in an electrical power saving state;
(I) selects a free real area based on the first RG;
(J) allocates the free selected real area to the virtual area of a write destination and writes write target data accompanying write command specifying the first VVOL to the selected free real area; and
(K) makes the first RG transit to an electrical power saving state again.

7. The storage system according to claim 1, wherein:
B) is a process in which the first RG is determined from the plurality of RAID groups, and
in the process (B), the controller determines an RG in which the total amount of real areas is smallest as the first RG.

8. The storage system according to claim 7, wherein:
the first RG is a RAID group in which the total amount of real areas is smallest and in which a percentage of the number of allocated real areas in the total amount of real areas is equal to or less than a prescribed threshold value.

9. The storage system according to claim 1, wherein:
each of the real areas that configure the pool belongs to any tier of a plurality of tiers,
the controller is provided with a storage resource,
the storage resource stores volume management information that includes, for every virtual volume, information that indicates whether a preference is given to a priority level of a tier or the total amount of real areas of a RAID,
in (B), in the case in which the controller specifies that a preference is given to a priority level of a tier for the first VVOL based on the volume management information, the controller specifies a RAID group that belongs to a tier in which a priority level is highest, and
the specified RAID group is the first RG.

10. The storage system according to claim 9, wherein:
the priority level of a tier is a priority level that complies with any one of a type, a performance, and a power consumption of a physical storage device that configures a RAID group.

11. The storage system according to claim 10, wherein:
the priority level of a tier is a higher priority level as a performance of a physical storage device in that tier is lower.

12. The storage system according to claim 10, wherein:
the priority level of a tier is a higher priority level as a power consumption of a physical storage device in that tier is higher.

13. The storage system according to claim 1, wherein:
(F) the controller judges whether or not there is a second real area that is allocated to the first VVOL and that is a real area based on the second RG,
(G) in the case in which the result of the judgment in (F) is positive, the controller moves data in the second real area to a free real area based on the first RG, and executes a second moving processing in which a real area based on the first RG group, is allocated, as a substitute for the second real area, to a virtual area to which the second real area is allocated, in (E), the controller sets all physical storage devices that configure the first RG to be in an electrical power saving state in the case in which there no real area based on the first RG that is allocated to the second VVOL and there is no real area based on the second RG that is allocated to the first VVOL, and
in the case in which a write command that specifies the first VVOL is received and a write destination is an unallocated virtual area,
the controller executes the following processes on a constant basis:
(H) releases an electrical power saving state on a temporary basis in the case in which the first RG is in an electrical power saving state;
(I) selects a free real area based on the first RG;
(I) allocates the free selected real area to the virtual area of a write destination and writes write target data accompanying write command specifying the first VVOL to the real selected free area; and
(K) makes the first RG transit to an electrical power saving state again.

14. An electrical power saving control method for a storage system includes:
a pool that is a storage area that is configured by a plurality of real areas based on a plurality of Redundant Array of Independent Disks (RAID) groups that are configured by a plurality of physical storage devices, and
a plurality of virtual volumes that are associated with the pool and are provided to at least one host;
wherein in the case in which a write command is received from the at least one host, a virtual area of a write destination is specified from the write command, a free real area of the pools is allocated to the specified virtual area of the write destination, and write target data accompanying the write command is written to the allocated free real area, said method comprising the steps of:
(A) specifying a first virtual volume (VVOL) that is a virtual volume of an electrical power saving target;
(B) specifying a first RAID group (RG) that is a RAID group of an electrical power saving target;
(C) judging whether or not there is a first real area that is allocated to a second VVOL that is a virtual volume other than the first VVOL and that is a real area based on the first RG;
(D) in the case in which the result of the judgment in (C) is positive, moving data in the first real area to a free real area based on a second RG that is a RAID group other than the first RG, and executing a first moving processing in which a real area based on the second RG group, is allocated, as a substitute for the first real area to a virtual area to which the first real area is allocated; and
(E) setting all physical storage devices that configure the first RG to be in an electrical power saving state in the case in which there is no real area based on the first RG that is allocated to the second VVOL as a real area based;
wherein the controller selects the first RG from the plurality of RAID groups based on capacity of the selected first RG being smaller than capacity of other RGs of the plurality of RAID groups.

\* \* \* \* \*